(12) United States Patent
Ogawa et al.

(10) Patent No.: US 8,539,142 B2
(45) Date of Patent: Sep. 17, 2013

(54) STORAGE SYSTEM COMPRISING NONVOLATILE SEMICONDUCTOR STORAGE MEDIA

(75) Inventors: Junji Ogawa, Sagamihara (JP); Atsushi Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 13/322,354

(22) PCT Filed: Sep. 30, 2011

(86) PCT No.: PCT/JP2011/072654
§ 371 (c)(1),
(2), (4) Date: Nov. 23, 2011

(87) PCT Pub. No.: WO2013/046464
PCT Pub. Date: Apr. 4, 2013

(65) Prior Publication Data
US 2013/0086304 A1    Apr. 4, 2013

(51) Int. Cl.
*G06F 12/00* (2006.01)
(52) U.S. Cl.
USPC .......... 711/103; 711/E12.081; 711/202; 711/203; 711/E12.078
(58) Field of Classification Search
USPC ...................................... 711/103
See application file for complete search history.

(56) References Cited

U.S. PATENT DOCUMENTS

| | | |
|---|---|---|
| 2009/0070520 A1 | 3/2009 | Mizushima |
| 2010/0030946 A1 | 2/2010 | Kano et al. |
| 2011/0066802 A1 | 3/2011 | Kawaguchi |

FOREIGN PATENT DOCUMENTS

| | | |
|---|---|---|
| JP | 2005-242897 | 9/2005 |
| JP | 2009-064251 A | 3/2009 |
| JP | 2011-065624 | 3/2011 |

OTHER PUBLICATIONS

PCT International Search Report and Written Opinion on application PCT/JP2011/072654 dated Dec. 13, 2011; 9 pages.

*Primary Examiner* — Reginald Bragdon
*Assistant Examiner* — Hamdy S Ahmed
(74) *Attorney, Agent, or Firm* — Foley & Lardner LLP

(57) ABSTRACT

Logical-physical translation information comprises information denoting the corresponding relationships between multiple logical pages and multiple logical chunks forming a logical address space of a nonvolatile semiconductor storage medium, and information denoting the corresponding relationships between the multiple logical chunks and multiple physical storage areas. Each logical page is a logical storage area conforming to a logical address range. Each logical chunk is allocated to two or more logical pages of multiple logical pages. Two or more physical storage areas of multiple physical storage areas are allocated to each logical chunk. A controller adjusts the number of physical storage areas to be allocated to each logical chunk.

14 Claims, 26 Drawing Sheets

| Block number | Page number in block | Attribute | Address | T601 |
|---|---|---|---|---|
| 10 | 0 | Valid | 100 | |
| | 1 | Invalid | None | |
| | 2 | Valid | 102 | |
| | 3 | Valid | 101 | |
| ● ● ● | | | | |
| 22 | 0 | Free | None | |
| | 1 | Free | None | |
| | 2 | Free | None | |
| | 3 | Free | None | |
| ● ● ● | | | | |

| Block number | Page number in block | Attribute | Address | ~T601 |
|---|---|---|---|---|
| 10 | 0 | Valid | 100 | |
| | 1 | Valid | 101 | |
| | 2 | Valid | 102 | |
| | 3 | Valid | None | |
| ⋮ | | | | |
| 22 | 0 | Free | None | |
| | 1 | Free | None | |
| | 2 | Free | None | |
| | 3 | Free | None | |
| ⋮ | | | | |

Fig. 6

| Block number | Page number in block | Attribute | Address | ~T601 |
|---|---|---|---|---|
| 10 | 0 | Valid | 100 | |
| | 1 | Invalid | None | |
| | 2 | Valid | 102 | |
| | 3 | Valid | 101 | |
| ⋮ | | | | |
| 22 | 0 | Free | None | |
| | 1 | Free | None | |
| | 2 | Free | None | |
| | 3 | Free | None | |
| ⋮ | | | | |

Fig. 7

| Block number | Page number in block | Attribute | Address | T601 |
|---|---|---|---|---|
| 10 | 0 | Invalid | None | |
| | 1 | Invalid | None | |
| | 2 | Invalid | None | |
| | 3 | Invalid | None | |
| ⋮ | | | | |
| 22 | 0 | Valid | 100 | |
| | 1 | Valid | 102 | |
| | 2 | Valid | 101 | |
| | 3 | Free | None | |
| ⋮ | | | | |

Fig. 8

| Block number | Page number in block | Attribute | Address | T601 |
|---|---|---|---|---|
| 10 | 0 | Free | None | |
| | 1 | Free | None | |
| | 2 | Free | None | |
| | 3 | Free | None | |
| ⋮ | | | | |
| 22 | 0 | Valid | 100 | |
| | 1 | Valid | 102 | |
| | 2 | Valid | 101 | |
| | 3 | Free | None | |
| ⋮ | | | | |

Fig. 9

| Block number | Page number in block | Attribute | Address | T601 |
|---|---|---|---|---|
| 10 | 0 | Valid | 100 | |
| | 1 | Valid | 101 | |
| | 2 | Free | None | |
| | 3 | Free | None | |
| ⋮ | | | | |
| 22 | 0 | Free | None | |
| | 1 | Free | None | |
| | 2 | Free | None | |
| | 3 | Free | None | |
| ⋮ | | | | |

Fig. 10

| Block number | Page number in block | Attribute | Address | T601 |
|---|---|---|---|---|
| 10 | 0 | Invalid | None | |
| | 1 | Invalid | None | |
| | 2 | Valid | 101 | |
| | 3 | Valid | 100 | |
| ⋮ | | | | |
| 22 | 0 | Free | None | |
| | 1 | Free | None | |
| | 2 | Free | None | |
| | 3 | Free | None | |
| ⋮ | | | | |

Fig. 11

| Block number | Page number in block | Attribute | Address | T601 |
|---|---|---|---|---|
| 10 | 0 | Invalid | None | |
| | 1 | Invalid | None | |
| | 2 | Invalid | None | |
| | 3 | Invalid | None | |
| ⋮ | | | | |
| 22 | 0 | Valid | 101 | |
| | 1 | Valid | 100 | |
| | 2 | Free | None | |
| | 3 | Free | None | |
| ⋮ | | | | |

Fig.12

| Block number | Page number in block | Attribute | Address | T601 |
|---|---|---|---|---|
| 10 | 0 | Free | None | |
| | 1 | Free | None | |
| | 2 | Free | None | |
| | 3 | Free | None | |
| ⋮ | | | | |
| 22 | 0 | Valid | 101 | |
| | 1 | Valid | 100 | |
| | 2 | Free | None | |
| | 3 | Free | None | |
| ⋮ | | | | |

Fig. 13

Logical chunk configuration information — 1701

T1801

| LBA | Logical chunk number | Page number in logical chunk |
|---|---|---|
| 0x00-0x07 | 0 | 0 |
| 0x08-0x1F | 1 | 0 |
| 0x10-0x17 | 2 | 0 |
| 0x18-0x1F | 3 | 0 |
| 0x20-0x27 | 0 | 1 |
| 0x28-0x2F | 1 | 1 |
| 0x30-0x37 | 2 | 1 |
| 0x38-0x3F | 3 | 1 |
| ⋮ | | |

Fig. 18

1702 Logical chunk-physical chunk translation information

T1901

| Logical chunk number | Page number in logical chunk | Physical chunk number | Page number in physical chunk |
|---|---|---|---|
| 0 | 0 | 0 | 12 |
|   | 1 |   | 4 |
|   | 2 |   | 23 |
|   | 3 |   | 24 |
|   | 4 |   | 18 |
|   | ⋮ |   | ⋮ |
| 1 | 0 | 1 | 34 |
|   | ⋮ |   |   |

Fig. 19

Physical chunk configuration information ~1703

| Physical chunk number | Used pool number | Number of used blocks | Used block number |
|---|---|---|---|
| 0 | 0 | 32 | 12 |
|   |   |    | 18 |
|   |   |    | ⋮  |
| 1 | 0 | 48 | 23 |
| ⋮ |   |    |    |

Page information in physical chunk 1704

T2101

| Physical chunk number | Block number | Page number | Status |
|---|---|---|---|
| 0 | 32 | 0 | Logical chunk 0 page number 12 |
| | | 1 | Invalid |
| | | 2 | Logical chunk 0 page number 4 |
| | | ⋮ | ⋮ |
| | 23 | 0 | Logical chunk 0 page number 8 |
| | | 1 | Free |
| | | ⋮ | ⋮ |
| | ⋮ | | |
| 1 | 66 | 0 | Invalid |
| ⋮ | | | |

Fig. 21

Pool configuration information /1705

T2201

| Pool number | Chip number | Block number | Status |
|---|---|---|---|
| 0 | 0 | 0 | Physical chunk 0 |
| | | 1 | Physical chunk 0 |
| | | 2 | Independent |
| | | 3 | Free |
| | | ⋮ | |
| | 1 | 0 | Physical chunk 3 |
| | | ⋮ | |
| 1 | 100 | 0 | Free |
| | ⋮ | | |

Fig. 22

Capacity allocation information 1706

T2301

| Number | Area | Attribute | Physical chunk number | Capacity allocation status | |
|---|---|---|---|---|---|
| | | | | Current | Target |
| 0 | 0x00-0xFFFF | Normal data | 0 | 4MB | 4MB |
| | | | 1 | 4MB | |
| | | | ⋮ | | |
| 1 | 0x10000-0x1FFFF | RAID 5 parity, high-frequency writes | 10 | 6MB | 8MB |
| | | | 11 | 8MB | |
| | | | ⋮ | | |
| 2 | 0x20000-0x2FFFF | Unallocated | 20 | 0MB | 0MB |
| | | | 21 | 0MB | |
| | | | ⋮ | | |
| 3 | 0x30000-0x3FFFF | Normal data, performance priority, low-frequency writes | 30 | 4MB | 5MB |
| | | | 31 | 4MB | |
| | | | ⋮ | | |
| 4 | 0x40000-0x4FFFF | Normal data, low-frequency writes | 40 | 6MB | 3MB |
| | | | 41 | 3MB | |
| | | | ⋮ | | |
| 5 | 0x50000-0x5FFFF | Normal data, capacity specified: +100% | 50 | 4MB | 4MB |
| | | | 51 | 4MB | |
| | | | ⋮ | | |

Fig. 23

STORAGE SYSTEM COMPRISING NONVOLATILE SEMICONDUCTOR STORAGE MEDIA

TECHNICAL FIELD

The present invention relates to storage control for a storage system comprising nonvolatile semiconductor storage media.

BACKGROUND ART

A storage system generally provides a logical volume, which has been created based on a RAID (Redundant Array of Independent Disks) group comprising multiple storage media, to a higher-level apparatus (for example, a host computer). In recent years, a flash storage, which uses a NAND flash memory, has been employed either in addition to or instead of a HDD (Hard Disk Drive) as the storage medium. The NAND flash memory is a nonvolatile semiconductor memory, and a read is performed in a unit called a page. Similarly, a write is also performed in units of pages, but at the time of a write, a target area must be erased beforehand. An erase is performed in a unit called a block, which comprises multiple pages.

The following control is effective for performing high-speed I/O processes (read/write processes) under such restrictions. First, the association of a logical address recognized by the higher-level apparatus and a physical address on the flash memory is managed. An erased area is created asynchronously to the I/O process from the higher-level apparatus. Write-target data from the higher-level apparatus is stored in the erased area that was prepared beforehand. When performing this control, an update data storage area for use as a buffer is necessary. The "update data storage area" referred to here is a free storage area (for example, a page in which valid data (the latest data with respect to the logical address) is not stored in an erased block) specified by a physical address that is not allocated to any logical address.

Patent Literature 1 discloses a method for using an area identified inside a block as the update data storage area.

CITATION LIST

Patent Literature

[PTL 1]
Japanese Patent Application Laid-open No. 2009-64251

SUMMARY OF INVENTION

Technical Problem

In a flash storage, the size of the update data storage area greatly impacts performance and life. Because the update data storage area cannot be directly used by the higher-level apparatus, user capacity (storage capacity denoted by the logical address space provided to the higher-level apparatus) is not included. Therefore, the user capacity of a system that uses 55% of physical onboard capacity (the total storage capacity of one or more flash storages) as the update data storage area will be one-half that of a system that uses 10% of physical onboard capacity as the update data storage area even when both systems have the same physical onboard capacity. Also, generally speaking, the larger the update data storage area, the better the write performance and life.

Whether priority is placed on capacity or performance (and/or life) will differ for each user who uses the flash storage, and even for the same user, will also differ according to the application program that is used (and/or the area or address used). For example, it is desirable that the size of the update data storage area be small for an area used by an application program that does not require high write performance, and, alternatively, it is desirable that the size of the update data storage area be large for an area used by an application program that does require high write performance.

This kind of problem is not limited to a flash storage, but rather can also occur in other types of nonvolatile semiconductor storage media.

An object of the present invention is to appropriately configure the size of the update data storage area in a nonvolatile semiconductor storage medium.

Solution to Problem

A storage system comprises a nonvolatile semiconductor storage medium, a storage part for storing logical-physical translation information, which is information denoting the corresponding relationship between a logical address and a physical storage area in the nonvolatile semiconductor storage medium, and a media controller, which is a controller that is coupled to the storage part and the nonvolatile semiconductor storage medium. The logical-physical translation information has information denoting corresponding relationships between multiple logical pages and multiple logical chunks, which form a logical address space of the nonvolatile semiconductor storage medium, and information denoting the corresponding relationships between the multiple logical chunks and multiple physical storage areas. Each logical page is a logical storage area conforming to a range of logical addresses. Each logical chunk is allocated to two or more logical pages of the multiple logical pages. Two or more physical storage areas of the multiple physical storage areas are allocated to each logical chunk. The media controller is configured so as to identify, based on the logical-physical translation information, a physical storage area allocated to a logical chunk to which a logical page belonging to a data write-destination logical address is allocated, and to write this data to this identified physical storage area. The media controller adjusts the number of physical storage areas to be allocated with respect to each logical chunk.

This storage system may be a stand-alone storage device comprising nonvolatile storage media and a media controller, may be a storage apparatus comprising one or more storage devices such as this and a higher-level controller coupled to these one or more storage devices, or may be a storage apparatus group in which multiple such storage apparatuses are combined. A higher-level apparatus may be a host computer, which is coupled to either a storage apparatus or a storage apparatus group, or may be the above-mentioned higher-level controller coupled to a storage device.

Advantageous Effects of Invention

The size of the update data storage area in the nonvolatile semiconductor storage medium can be appropriately configured.

BRIEF DESCRIPTION OF DRAWINGS

FIG. 6 is an example of logical-physical translation information at a first point in time in a first aspect of a page state transition related to the example.

FIG. 7 is an example of logical-physical translation information at a second point in time in a first aspect of a page state transition related to the example.

FIG. 8 is an example of logical-physical translation information at a third point in time in a first aspect of a page state transition related to the example.

FIG. 9 is an example of logical-physical translation information at a fourth point in time in a first aspect of a page state transition related to the example.

FIG. 10 is an example of logical-physical translation information at a first point in time in a second aspect of a page state transition related to the example.

FIG. 11 is an example of logical-physical translation information at a second point in time in a second aspect of a page state transition related to the example.

FIG. 12 is an example of logical-physical translation information at a third point in time in a second aspect of a page state transition related to the example.

FIG. 13 is an example of logical-physical translation information at a fourth point in time in a second aspect of a page state transition related to the example.

FIG. 18 shows an example of the configuration of logical chunk configuration information related to the example.

FIG. 19 shows an example of the configuration of logical chunk-physical chunk translation information related to the example.

FIG. 20 shows an example of the configuration of physical chunk configuration information related to the example.

FIG. 21 shows an example of the configuration of page information in a physical chunk related to the example.

FIG. 22 shows an example of the configuration of pool configuration information related to the example.

FIG. 23 shows an example of the configuration of capacity allocation information related to the example.

DESCRIPTION OF EMBODIMENTS

Figure 1:
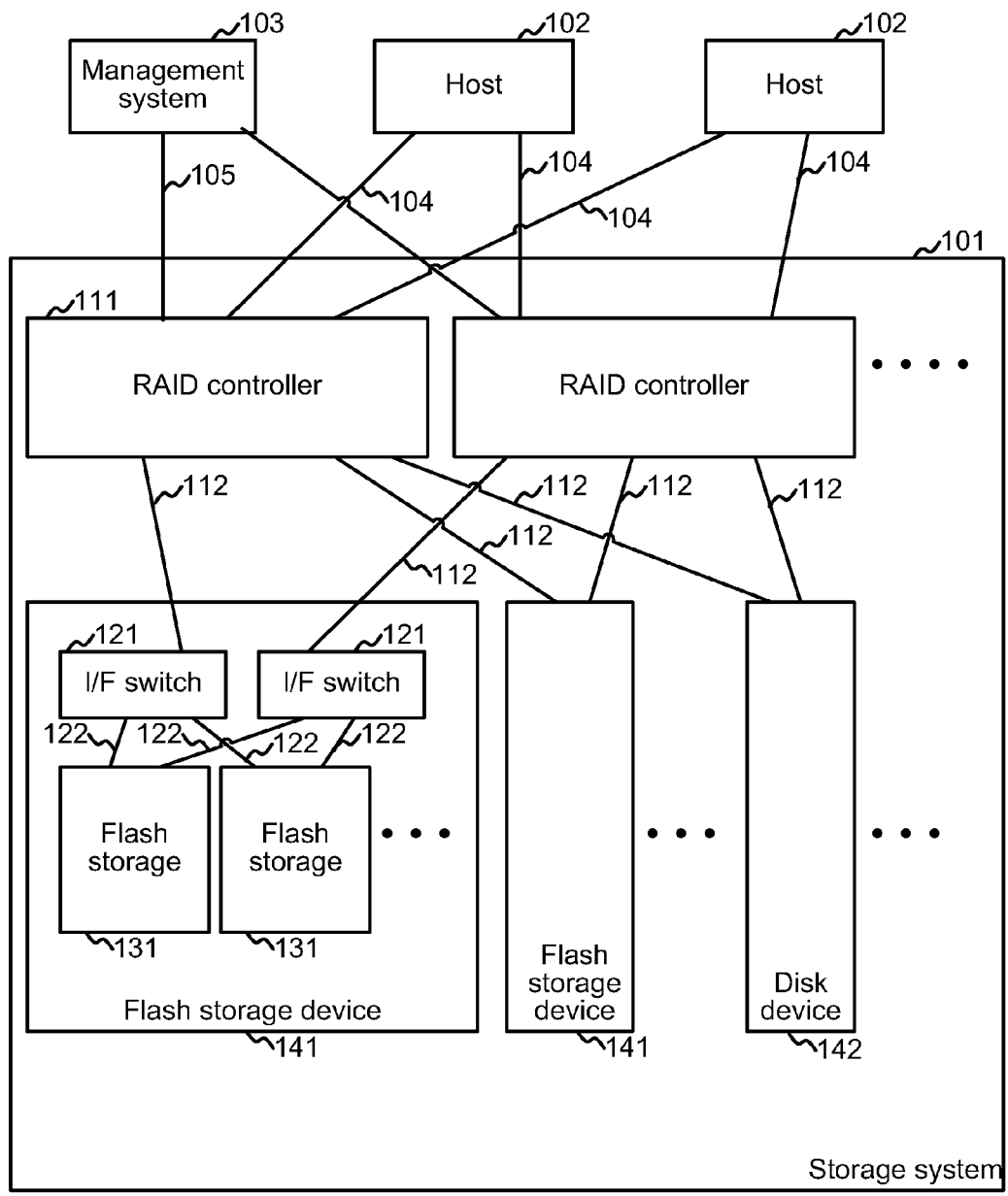
FIG. 1 shows an example of the entire configuration of a computer system comprising a storage system related to an example.

An example will be explained below based on the drawings.

Furthermore, in the following explanation, various types of information may be explained using the expression "xxx table", but the various information may also be expressed using a data structure other than a table. To show that the various information is not dependent on the data structure, "xxx table" can be called "xxx information".

Also, in the following explanation, identification information comprising a number is used to identify an element (for example, a page, a chunk, and a flash memory chip (FM chip)), but information that does not comprise a number may be used as the identification information.

Furthermore, in the following explanation, when giving an explanation that distinguishes between elements of the same type, a combination of the element name and the identification information may be used in place of a combination of the element name and a reference sign. For example, a page with the identification information (identification number) "0" may be written as "page #0".

Also, in the following explanation, there may be cases where processing is explained having a "program" as the doer of the action, but since the stipulated processing is performed in accordance with a program being executed by a processor included in a controller (for example, a CPU (Central Processing Unit)) while using a storage resource (for example, a memory) and/or a communication interface device (for example, a communication port) as needed, either the controller or the processor may also be used as the doer of the processing. A process, which is explained using the program as the doer of the action, may be regarded as a process performed by a below-described flash storage device, flash storage, flash controller, RAID controller or storage system. Furthermore, the controller may comprise a hardware circuit that performs either part or all of the processing carried out by the processor either instead of or in addition to the processor. A computer program may be installed in either the below-described flash controller or RAID controller from a program source. The program source, for example, may be either a program delivery server or a computer readable storage medium.

An aggregation of one or more computers for managing the computer system (or a storage system included in the computer system) may be called a management system. In a case where the management system displays display information, a computer is the management system. A combination of a computer and a display apparatus is also a management system. To increase the speed and enhance the reliability of management processing, the same processing as that of the management system may be realized using multiple computers, and in this case, these multiple computers (to include a display apparatus when the display apparatus carries out a display) are the management system. The management system comprises input/output devices. Examples of the input/output devices may include a display, a keyboard, and a pointing device, but another type of device (for example, a touch panel display apparatus instead of the display, keyboard, and pointing device) may be used in place of at least one of these devices. Also, as an alternative to an input/output device, a serial interface or an Ethernet interface (Ethernet is a registered trademark) may be used as an input/output device, a display apparatus comprising either a display, a keyboard, or a pointing device may be coupled to this interface, and the inputs and displays via the input-output device may be substituted for by sending display information to the display apparatus and receiving input information from the display apparatus and by carrying out displays and receiving input using the display apparatus.

In the following explanation, an interface device may be abbreviated as "I/F".

Also, in the following explanation, it is supposed that the flash memory (FM) is the type of flash memory in which an erase is performed in units of blocks and an access is performed in units of pages, and typically is a NAND-type flash memory. However, the flash memory may be another type of flash memory (for example, a NOR type) instead of a NAND type. Also, another type of nonvolatile semiconductor storage medium, for example, a phase-change memory, may be used in place of the flash memory.

In the following explanation, the nonvolatile semiconductor storage medium is a NAND-type flash memory. For this reason, the terms page and block will be used. Also, in a case where a certain logical page (called "target logical page" in this paragraph) is a write destination, and, in addition, a physical page (called "first physical page" in this paragraph) is already allocated to the target logical page and data is stored in the first physical page, a free physical page (called "second physical page" in this paragraph) is allocated to the target logical page in place of the first physical page, and the data is written to this second physical page. The data written to the second physical page is the latest data with respect to the target logical page, and the data stored in the first physical page is the old data with respect to the target logical page. Hereinbelow, the latest data may be called "valid data" and the old data may be called "invalid data" with regard to each logical page. Furthermore, the physical page storing the valid data may be called a "valid physical page", and the physical page storing the invalid data may be called an "invalid physical page".

FIG. 1 shows an example of the overall configuration of a computer system comprising a storage system related to a practical example.

A computer system comprises a storage system 101, a host computer (host hereinafter) 102, and a management system 103.

The host 102 comprises a communication port for coupling to the storage system 101. The host 102 is coupled to the storage system 101 by way of a host coupling path 104 via this port. Similarly, the management system 103 is coupled to the storage system 101 by way of a management coupling path 105. FIG. 1 shows a configuration in which the host 102 and the storage system 101 are directly coupled, but the configuration may be such that the host coupling path 104 may be a network called a SAN (Storage Area Network) capable of supporting numerous hosts, management systems and storages. A protocol such as Fibre Channel or iSCSI can be used as the SAN here. Also, the management coupling path 105 may be the same coupling path as the host coupling path 104, or may be a different coupling path. For example, the host coupling path 104 may be a SAN, and the management coupling path 105 may be a LAN (Local Area Network). At least one of the coupling paths 104 and 105 may be a communication network other than the SAN and LAN described above.

The storage system 101 comprises a RAID controller 111, a flash storage device 141, and a disk device 142. The flash storage device 141 and the disk device 142 are coupled to the RAID controller 111 via an internal bus 112. The storage system 101 realizes a redundant configuration in accordance with RAID, and for this reason, comprises a RAID controller 111. However, the present invention is not limited to using a RAID configuration.

The flash storage device 141 comprises a I/F switch 121 and a flash storage 131. The RAID controller 111 is coupled to the I/F switch 121 via the internal bus 112, and, in addition, the flash storage 131 is coupled to the I/F switch 121 via a disk coupling path 122. The storage medium that actually stores data is the flash storage 131. The flash storage 131, for example, is a SSD (Solid State Drive).

The disk device 142 comprises a disk-type storage medium, for example, a HDD (Hard Disk Drive). The HDD I/F, for example, may be a FC (Fibre Channel), a SAS (Serial Attached SCSI), or an ATA. The disk-type storage medium may be another type of medium besides the HDD, for example, a DVD (Digital Versatile Disk) drive. Also, instead of the disk device 141, for example, another type of storage medium may be used, such as a tape apparatus that comprises a tape.

In this example, a description has been provided that distinguishes between the flash storage device 141 and the disk device 142, but it is also possible to use the flash storage 131 together with another disk device by making these devices physically and logically compatible. For example, an SSD comprising an SAS protocol disk I/F and a SAS HDD can be installed and used inside the same apparatus.

Figure 2:
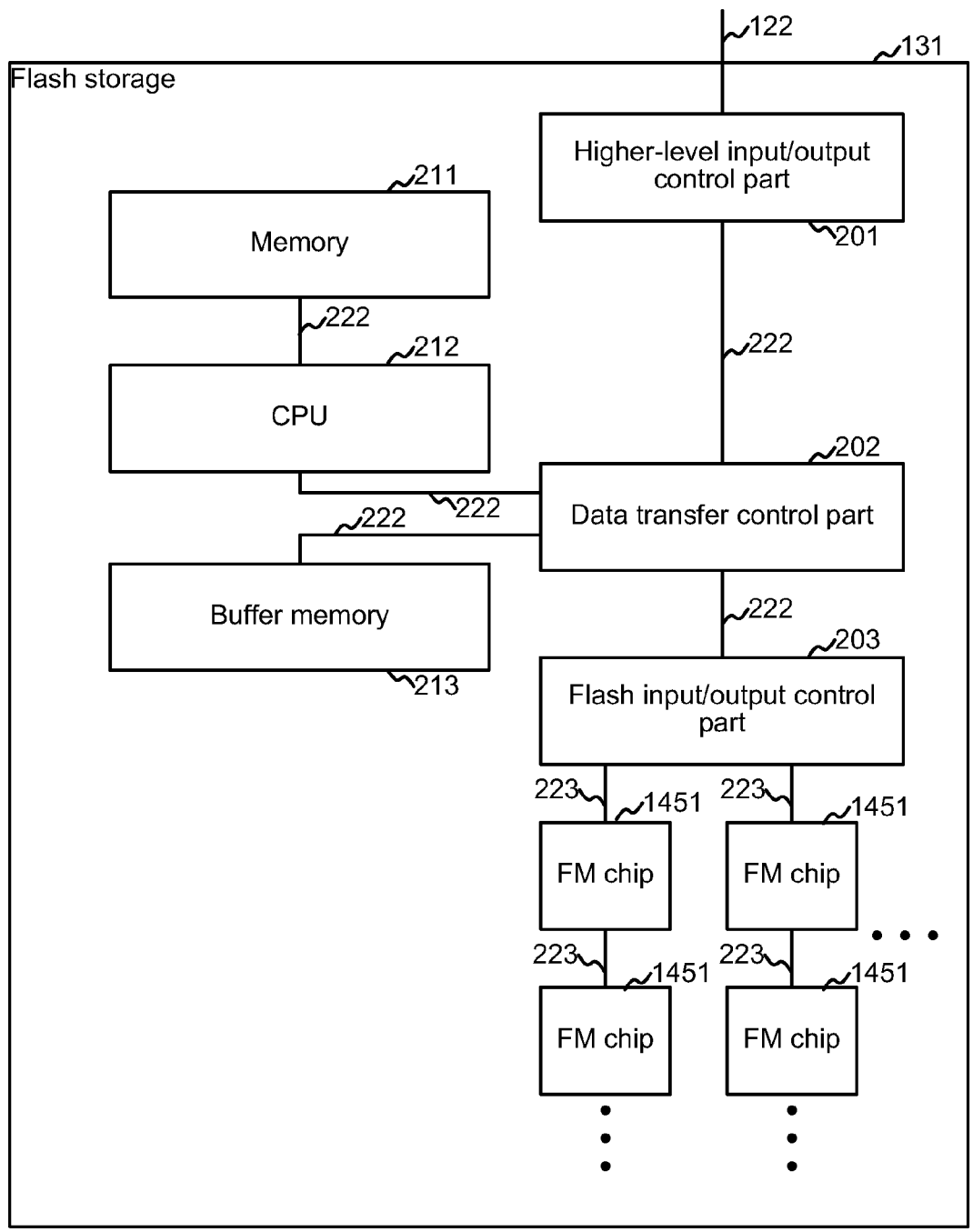
FIG. 2 shows an example of the internal configuration of a flash storage related to the example.

FIG. 2 shows an example of the internal configuration of the flash storage 131.

The flash storage 131 comprises a flash controller, and a flash memory coupled to the flash controller.

The flash controller comprises a higher-level I/F, a storage part, a buffer memory 213, a lower-level I/F, and a control part coupled thereto. The higher-level I/F, for example, is a higher-level input/output control part 201. The storage part, for example, comprises a memory 211. The lower-level I/F, for example, is a flash input/output control part 203. The control part, for example, comprises a data transfer control part 202 and a CPU 212. The components 201, 202, 203, 213, 211 and 212 are coupled via an internal bus 222.

The flash memory comprises multiple FM (flash memory) chips 1451. The multiple FM chips 1451 are coupled to the flash input/output control part 203 via a FM bus 223. The flash memory may be an example of an auxiliary storage device.

The higher-level input/output control part 201 is coupled to the I/F switch 121 by way of the disk coupling path 122, and controls the input/output of data to/from a higher-level apparatus.

The data transfer control part 202 controls the transfer of data inside the flash storage 131.

The flash input/output control part 203 controls the input/output of data to/from the FM chip 1451 by way of the FM bus 223.

The CPU 212 is coupled to the data transfer control part 202 via the internal bus 222, executes various arithmetic processes in accordance with programs stored in the memory 211, and controls the entire flash storage 131.

The buffer memory 213 temporarily stores data exchanged with the higher-level input/output control part 201 and the flash memory input/output control part 203.

At least one of the components shown in FIG. 2 need not be in the flash storage 131. For example, a configuration that uses a chip that integrates the CPU 212 and respective other control parts, or a configuration that uses a chip that integrates only a portion of these may be used. Also, for example, a configuration that physically combines the memory 211 and the buffer memory 213 in the same memory may be used.

Figure 3:
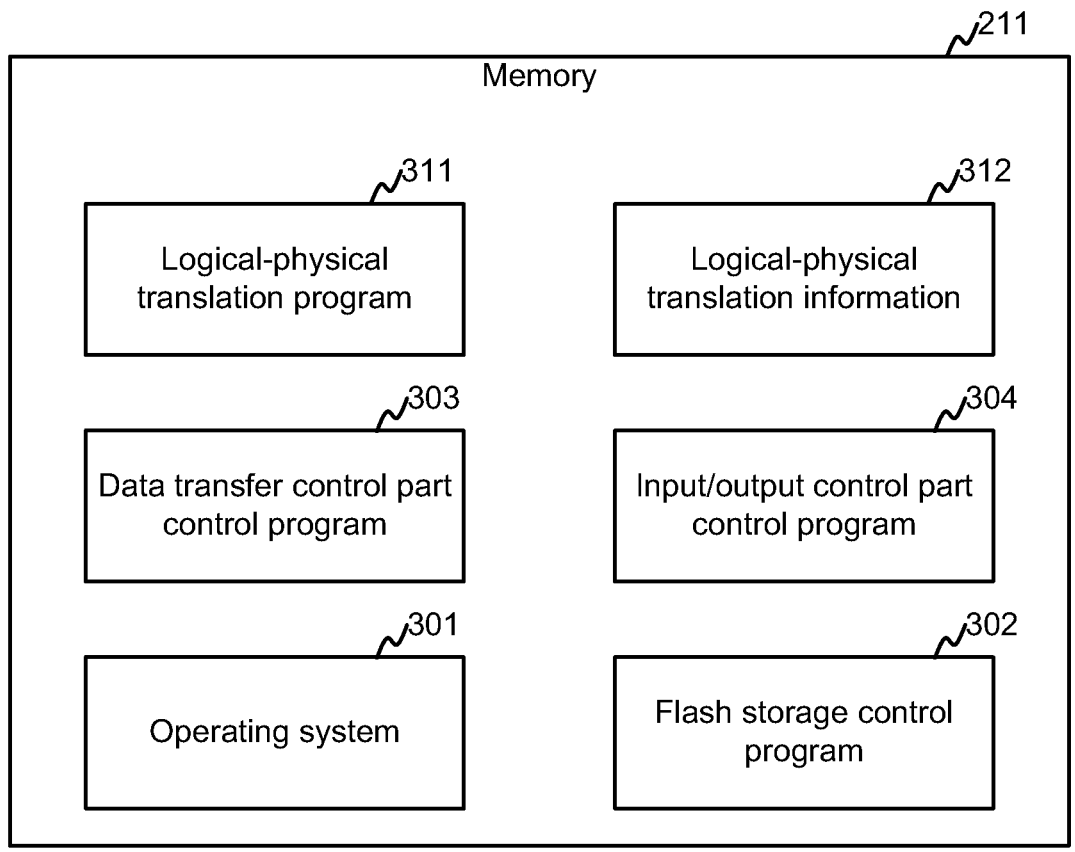
FIG. 3 shows an example of information stored in a memory inside the flash storage related to the example.

FIG. 3 shows an example of information stored in the memory 211.

The memory 211 may be an example of a main storage device. The memory 211, for example, stores an operating system 301, a flash storage control program 302, a data transfer control part control program 303, an input/output control part control program 304, a logical-physical translation program 311, and logical-physical translation information 312. The programs 301 through 304 and 311 are executed by the CPU 212.

The operating system 301 is a program for performing scheduling and other basic processing when the CPU 212 executes the respective programs.

The flash storage control program 302 is used for controlling the operation of the flash storage 131 as a storage device, such as for managing a volume provided to the higher-level apparatus by the flash storage 131 and for managing the buffer memory.

The data transfer control part control program 303 is used for controlling the data transfer control part 202.

The input/output control part control program 304 is used for controlling the higher-level input/output control part 201 and the flash input/output control part 203.

The logical-physical translation program 311 is for translating and finding the part of a physical address, which is a physical location on the flash memory, to which a logical address, which is an input/output request (I/O request) issued from a higher-level apparatus (either the RAID controller 111 or the host 102 in this example), corresponds. Furthermore, "logical address" as used in this example, for example, may be a LBA (Logical Block Address).

The logical-physical translation information 312 is for use in translation when running the logical-physical translation program 311.

Besides the information shown in FIG. 3, the memory 211 may also store information for controlling the higher-level apparatus input/output control part 201 and the flash input/output control part 203.

Figure 4:
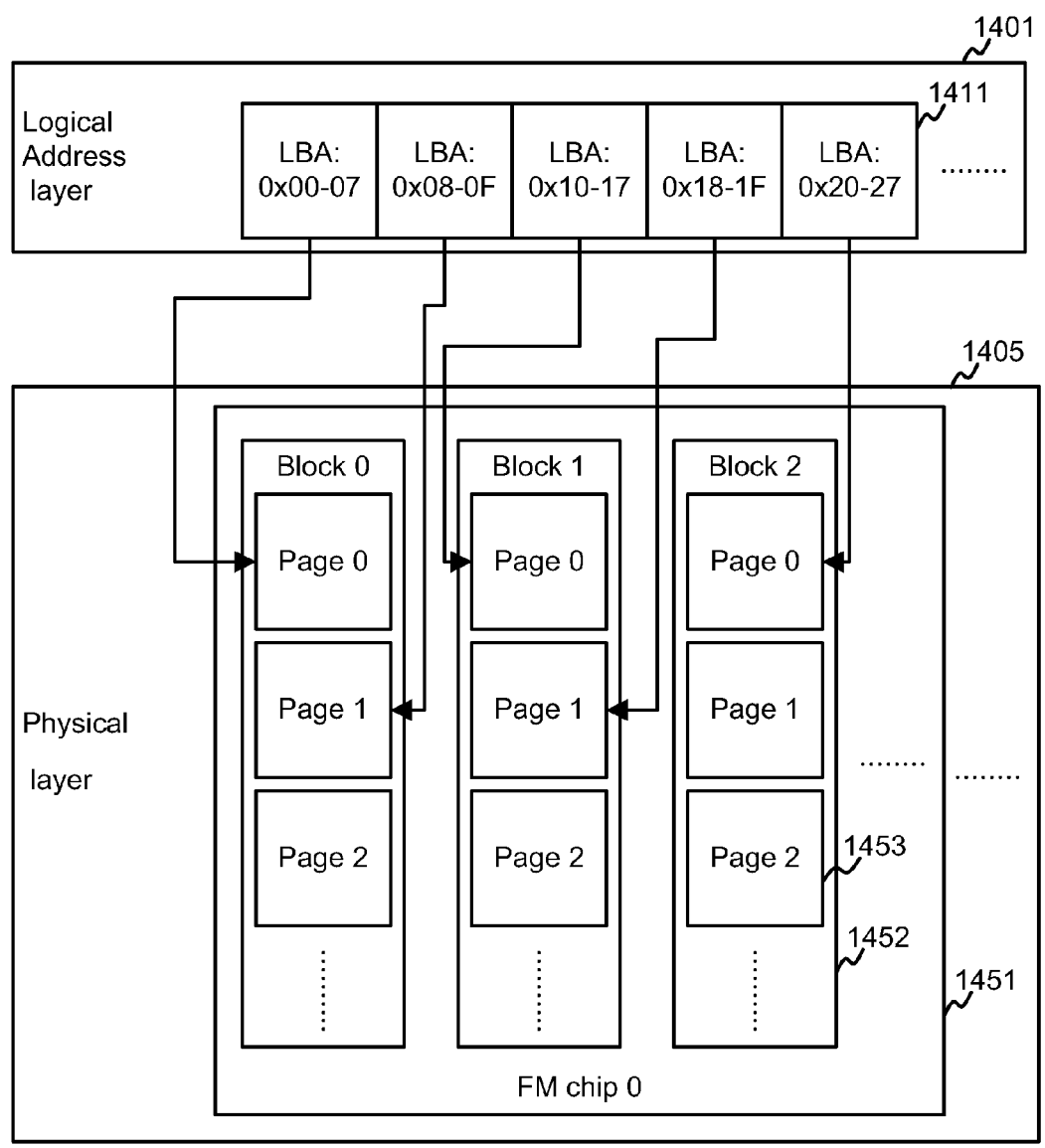
FIG. 4 shows an example of an overview of a logical-physical translation process related to the example.

FIG. 4 shows an example of an overview of a logical-physical translation process.

A logical address layer 1401 is addresses denoting locations on a volume, which the flash storage 131 provides to the higher-level apparatus (the RAID controller 111 or the host 102 in this example). Here, to make the explanation easier to understand, it is supposed that a logical space is partitioned into multiple logical pages 1411, and that the size of the logical page 1411 is the same size as a physical page of the FM chip 1451. It is supposed here that the size of the logical page 1411 is equivalent to eight volume blocks. The "volume block" referred to here is an individual storage area comprising a logical volume provided to the host 102.

According to the logical-physical translation program 311, an area of the logical address layer is associated with a physical area in a physical layer 1405. The physical layer 1405 is a layer comprised of multiple FM chips 1451. Each FM chip 1451 is comprised of multiple physical blocks 1452, which are the erase units of the NAND flash memory. Each physical block 1452 is comprised of multiple physical pages 1453, which are the read/write units. Then, a logical page 1411 is associated with a physical page 1453.

For example, in the example of FIG. 4, an area from LBA 0x00 to 0x07 is allocated to physical page #0 of physical block #0 of FM chip #0. In a case where a read request specifying the area from LBA 0x00 to 0x07 is issued from either the host 102 or the RAID controller 111, which are the higher-level apparatuses with respect to the flash storage 131, the flash controller receives this read request, reads data in accordance with this read request from the physical page #0 of the physical block #0 of the FM chip #0 based on the above-mentioned allocation information (the logical-physical translation information 312), and returns the result (to include this read data) to the higher-level apparatus.

In FIG. 4, the size of the logical page has been made the same as the size of the physical page, but the sizes of these pages do not always have to be the same. In a case where the logical page size is smaller than the physical page size, for example, a case in which it is half the size, it becomes possible to decide a storage location for each range that is smaller than the logical space. That is, the four volume blocks from logical address 0x00 to 0x03 and the four volume blocks from 0x04 to 0x07 can be stored in separate physical pages.

Alternatively, in a case where the logical page size is larger than the physical page size, it is desirable that certain restrictions be placed on the arrangement of the physical pages. For example, the range from logical address 0x00 to 0x0F is associated with two physical pages, but it is desirable that these physical pages be a page group that is automatically decided on the basis of a fixed rule, such as consecutive physical pages inside the same physical block. In accordance with this, it becomes possible to reduce management information the same as when using a virtually enlarged physical page.

A write process in the flash storage 131 will be considered here.

Figure 5:
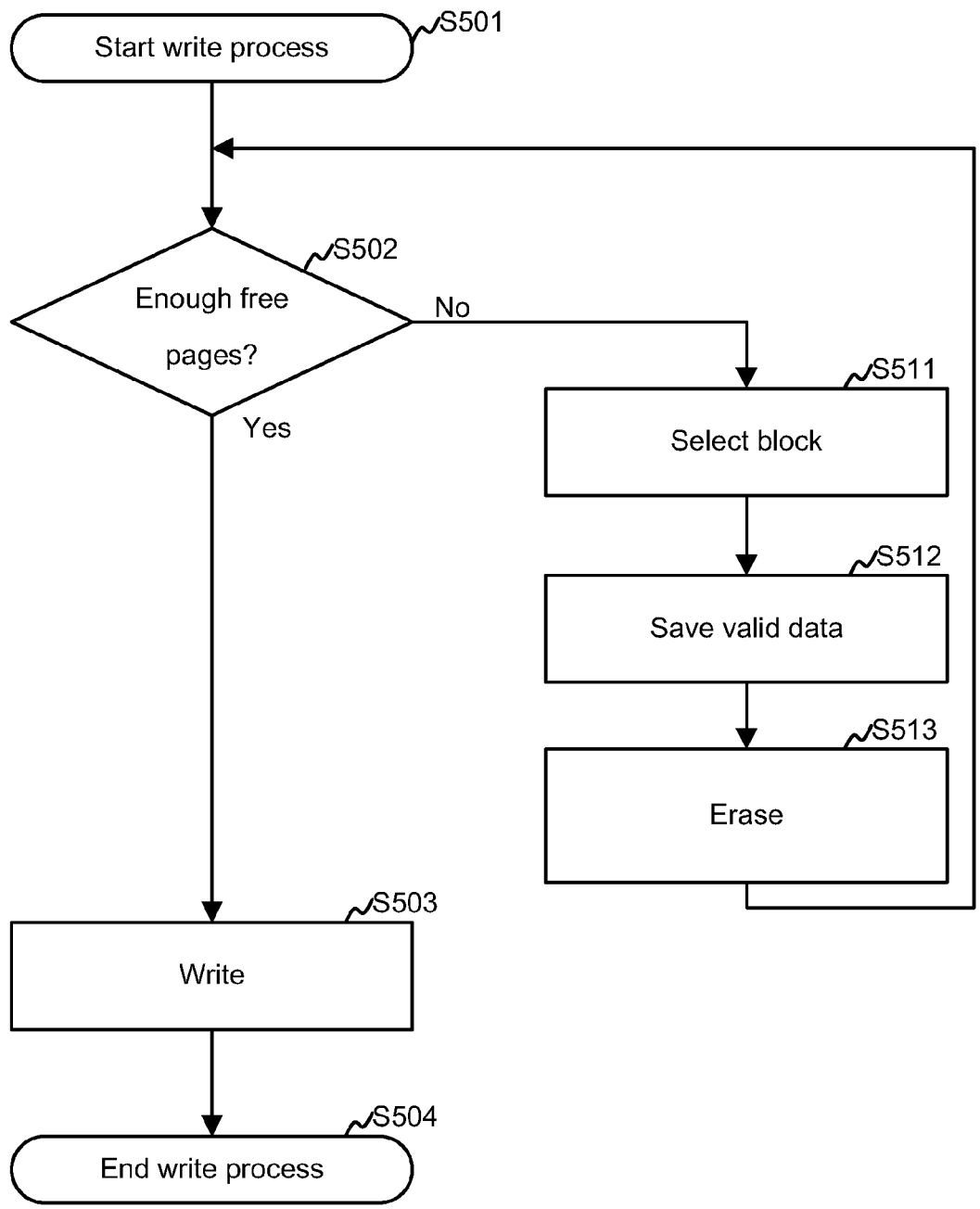
FIG. 5 is a flowchart showing a first example of the flow of a write process related to the example.

FIG. 5 is a flowchart showing an example of the flow of a write process.

In S501, the write process is started. The write process typically is started when the flash controller has received a write request from the higher-level apparatus.

The flash controller first determines whether or not enough free physical pages exist for a write (for example, whether the total size of free physical pages suitable as the data write destination is equal to or larger than the size of the write-target data) (S502). This is attributable to the fact that overwriting is not possible in the NAND flash memory, and an erase must be performed prior to performing a write. S502 is the process for determining whether an erased physical page that is able to be written to exists or not.

The flash controller, in a case where there are enough free physical pages for a write, writes the write-target data to these free physical pages (S503) and ends the processing (S504).

Alternatively, in a case where there are not enough free physical pages for a write, the flash controller selects a free physical page creation target block from multiple erase candidate physical blocks (S511). The "erase candidate physical block", for example, is a physical block in which data is written up to the physical page at the end of the block. In particular, it is desirable that a physical block with few physical pages associated with a logical address (physical pages storing valid data) be regarded as an erase candidate for the page save process, which will be described further below. Next, the flash controller saves the valid data in the selected physical block to another free physical block (S512). The valid data, according to the definition described hereinabove, is data that exists in the physical page actually allocated to the logical page at the point in time of this processing. Because the valid data is data that must not be erased as-is, this valid data must be saved to another physical block. The valid data save process is one in which the valid data in the valid physical block is copied to a different physical block from the physical block that comprises this valid physical page, and the allocation relationship is updated. Since the copy-source data transitions from valid data to invalid data (unnecessary data) when this process is performed, the copy-source physical page transitions from a valid physical page to an invalid physical page. When the valid data save is complete, the free physical page creation target block (copy-source physical block) comprises only non-valid physical pages, that is, either invalid physical pages or free physical pages in which there was no data originally. When the save is complete, the flash controller performs an erase process with respect to the free physical page creation target block (the physical block selected in S511) (S513). According to the erase process of S513, all of the physical pages in the free physical page creation target block become capable of being used as free physical pages. According to this process, the free physical pages for write use increase. The flash controller once again determines whether or not there are enough free physical pages for write use (S502), and continues the write process.

In FIG. 5, a free physical page creation process (S511 through S513) is performed during a write process, but this creation process may be performed asynchronously with respect to the write process (that is, as a separate process from the write process rather than a process included in the write process). Performing the free physical page creation process asynchronously with respect to the write process does away with the need for a free physical page creation process within the write process, and can be expected to heighten write process performance.

The flow of the write processing shown in FIG. 5 will be considered from the aspect of a page state transition.

FIG. 6 shows the status of multiple physical blocks and physical pages at a first point in time in a first aspect of a page state transition.

The logical-physical translation information 312 comprises a logical-physical translation table T601 corresponding to the hierarchical structure of FIG. 4. The table T601 is a simplified version of a logical-physical translation table, and is block-page table comprising information related to a physical block and a physical page. As a premise, it is supposed that the number of physical pages in a physical block is four, and that the area capable of being used by the user is 75% of the total physical capacity. That is, on average, three of the four physical pages in the physical block constitute a valid state (valid physical pages). According to the block-page table T601 of the first point in time shown in FIG. 6, valid data is stored in physical pages #0, #1, and #2 in physical block #10, and physical page #3 in physical block #10 is in the free state. The physical block #22 is in a state immediately subsequent to an erase process (all the physical pages are free physical pages).

FIG. 7 shows a block-page table T601 at a point in time (a second point in time) after a write subsequent to the point in time of FIG. 6.

According to the second point in time table T601, data of address #101 is stored in physical page #3 of physical block #10, which was a free physical page at the first point in time. Since the physical page #1 of physical block #10, which had stored the data of address #101 at the first point in time, is already storing unnecessary data, it is an invalid physical page. The second point in time table T601 corresponds to the state subsequent to the execution of S503 of FIG. 5.

FIG. 8 shows a block-page table T601 at a point in time (a third point in time) after a valid data save process has been performed subsequent to the point in time of FIG. 7.

According to the third point in time table T601, the valid data in the valid physical pages #0, #2, and #3 of the physical block #10 at the second point in time has been copied to the physical pages #0, #1, and #2 of the physical block #22, and the copy-source physical pages #0, #2, and #3 have all transitioned to invalid physical pages. The third point in time table T601 corresponds to the state subsequent to the execution of S511 of FIG. 5.

FIG. 9 shows a block-page table T601 at a point in time (a fourth point in time) after an erase process has been performed with respect to the physical block #10 in which all the valid physical pages have transitioned to non-valid physical pages (either invalid physical pages or free physical pages) subsequent to the point in time of FIG. 8.

According to the fourth point in time table T601, all the pages in the physical block #10 have transitioned to the free state. The fourth point in time table T601 corresponds to the state subsequent to the execution of S513 of FIG. 5.

Comparing FIG. 6 to FIG. 9 here, it is clear that, even though the data storage locations differ, the page attributes (valid, invalid, or free) and the number of physical pages of each type of attribute match. That is, according to the processing explained by referring to FIGS. 6 through 9, the flow of the write, which also comprised a data save and an erase, was completed. Within the flow of processing explained by referring to FIG. 6 through 9, the write conforming to the write request issued from the higher-level apparatus is equal to or smaller in size than one page (physical page #3 of physical block #10). Alternatively, since the write performed with respect to the flash memory also comprises the copying of the valid physical pages, this write is four pages (physical page #3 of physical block #10, physical page #0 of physical block #22, physical page #1 of physical block #22, and physical page #2 of physical block #22).

FIG. 10 shows a block-page table T601 at a first point in time in a second aspect of a page state transition. In the second aspect, the premise is that the area capable of being used by the user is 50% of the total physical capacity. That is, on average, two of the four physical pages in the physical block are in the valid state.

FIG. 11 shows a block-page table T601 at a point in time (second point in time) after a write has been performed subsequent to the point in time of FIG. 10.

According to the second point in time table T601, the data of addresses #100 and #101 are respectively stored in physical pages #2 and #3 of physical block #10, which were free pages at the first point in time. In accordance with this, physical pages #0 and #1 of the physical block #10 respectively transition to invalid physical pages. The second point in time table T601 corresponds to the state subsequent to the execution of S503 of FIG. 5.

FIG. 12 shows a block-page table T601 at a point in time (a third point in time) after a valid data save process has been performed subsequent to the point in time of FIG. 11.

According to the third point in time table T601, the data in the valid physical pages #2 and #3 included in the physical block #10 at the second point in time has been copied to the physical pages #0 and #1 of the physical block #22, and the copy-source physical pages #2, and #3 have both transitioned to invalid physical pages. The third point in time table T601 corresponds to the state subsequent to the execution of S511 of FIG. 5.

FIG. 13 shows a block-page table T601 at a point in time (a fourth point in time) after an erase process has been performed with respect to the physical block 10 in which all the valid physical pages have transitioned to non-valid physical pages (invalid physical pages) subsequent to the point in time of FIG. 12.

According to the fourth point in time table T601, all the physical pages in the physical block 10 have transitioned to the free state. The fourth point in time table T601 corresponds to the state subsequent to the execution of S513 of FIG. 5.

Comparing FIG. 10 to FIG. 13 here, it is clear that similar to the relationship between FIG. 6 and FIG. 9, even though the data storage locations differ, the number of physical pages match for each attribute (valid, invalid, or free). Within the flow of processing explained by referring to FIGS. 10 through 13, the write conforming to the write request issued from the higher-level apparatus is two pages (physical pages #2 and #3 of physical block #10). Alternatively, since the write performed with respect to the flash memory also comprises the copying of the valid physical pages, this write is four pages (physical pages #2 and #3 of physical block #10 and physical pages #0 and #1 of physical block #22).

The capacity ratio (percentage of capacity) capable of being used by the user with respect to the physical capacity as a prior condition differed for FIGS. 6 and 9 and for FIGS. 10 and 13, and this difference affected the difference in the amount of free physical pages for write use (updated data storage area). Four pages worth of writes were performed with respect to the flash memory for both FIG. 6 through 9 and FIG. 10 through 13, but the writes conforming to the write requests from the higher-level apparatus were one page and two pages, respectively, causing the amount of writes (the number of pages to which data is written) to differ. In a case where the amount of writes performed to the flash memory increases significantly with respect to the amount of writes conforming to the write request from the higher-level apparatus, performance worsens as a result of the writes or copy processes using resource required to access the flash memory, and the life is shortened by the increased number of writes to the flash memory. That is, this indicates that increasing the updated capacity makes it possible to improve performance and life.

Figure 25:
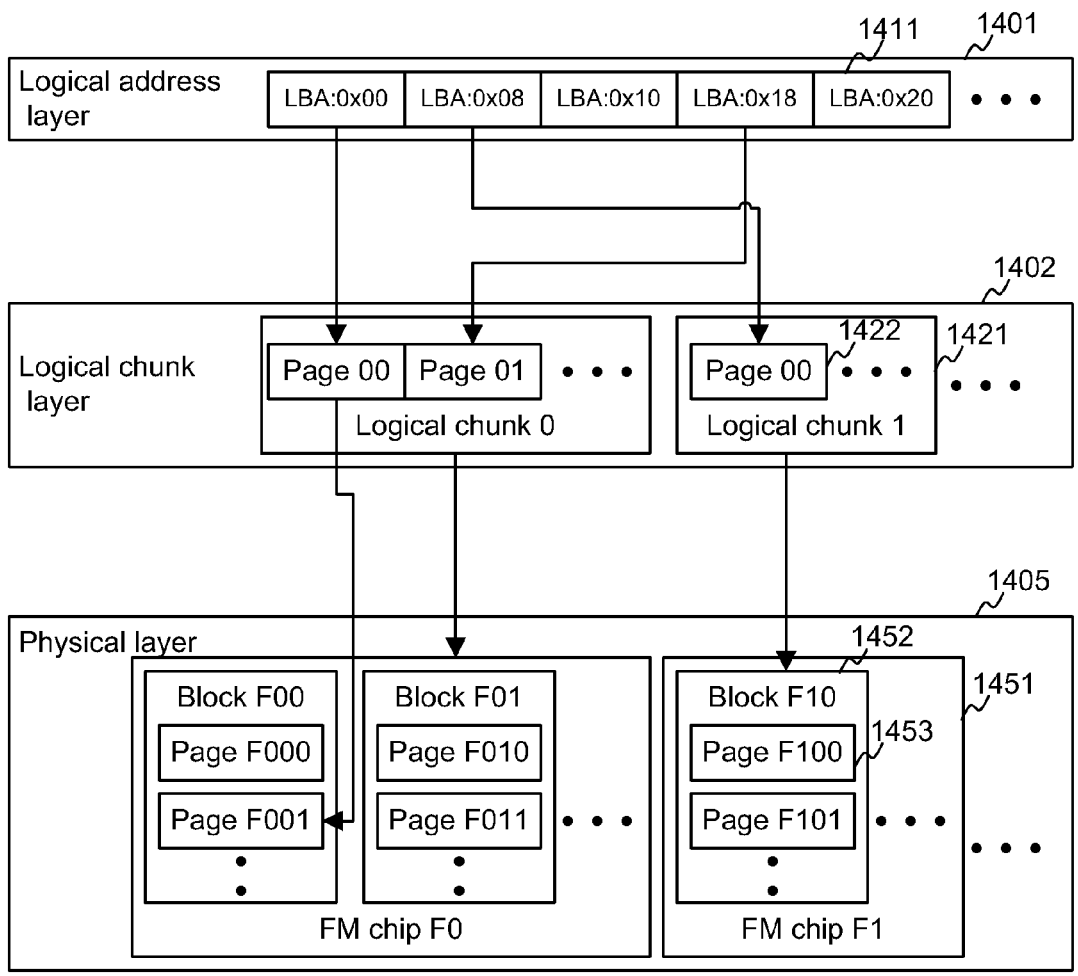
FIG. 25 is a first example of a hierarchical structure related to a logical-physical translation related to the example.

FIG. 25 shows a first example of the hierarchical structure for realizing a logical-physical translation related to the example.

The highest layer is the logical address layer 1401, and is the layer recognized by the RAID controller 111 and host 102, which are the higher-level apparatuses. To make the explanation easier to understand, it is supposed that a logical page 1411 of the same size as a physical page 1453 is managed in the logical address layer 1401.

A logical chunk layer 1402 is disposed as a first intermediate layer between the logical address layer 1401 and the physical layer 1405. The logical chunk layer 1402 comprises multiple logical chunks 1421. Each logical chunk 1421 comprises multiple LC pages 1422. Hereinbelow, a page inside a logical chunk 1421 may be called "LC page".

The logical page (logical address range) 1411 is mapped as a LC page 1422. In addition, the LC page 1422 is mapped to a physical page 1453 in the physical layer 1405.

According to these mappings, the logical page 1411 is allocated to the physical page 1453 and the actual data storage location is decided by way of the logical chunk 1421 (LC page 1422). For example, LBA 0x00 is mapped as LC page #00, and this LC page #00 is mapped to the physical page #F001. For this reason, data having the LBA 0x00 as the write destination is stored in the physical page #F001.

According to FIG. 25, a logical chunk 1421 is mapped to an FM chip 1451. That is, the logical chunk #0 is mapped to FM chip #F0, and logical chunk #1 is mapped to FM chip #F1. This signifies that the LC page 1422 in the logical chunk #0 can only be associated with any of the physical pages of FM chip #F0. Configuring such a restriction makes it possible to reduce the size of the logical-physical translation information 312. For example, in a case where there is either no or one logical chunk 1421 and the number of pages to be mapped, for example, is $2^{16}$, two bytes of information are needed per page as information included in the logical-physical translation information 312. Alternatively, in a case where the logical space has been partitioned into $2^8$ logical chunks 1421, the number of pages in the logical chunk 1421 to be mapped, for example, is $2^8$, and the information comprising the logical-physical translation information 312, for example, may be one byte per page. Thus, providing a logical chunk layer 1402 makes it possible to reduce the size of the logical-physical translation information 312.

In the example of FIG. 25, in a case where there is no logical chunk layer 1402, information for recognizing all the physical pages 1453 that exist in the physical layer 1405 is needed, but in a case where a logical chunk layer 1402 exists, each logical chunk 1421 is mapped to an FM chip 1451, thereby doing away with the need for information for recognizing all the physical pages 1453. This is because it is possible to compute the physical pages 1453 that exist in the FM chip 1451 based on the location (relative location) of a page in the logical chunk 1421.

Figure 14:
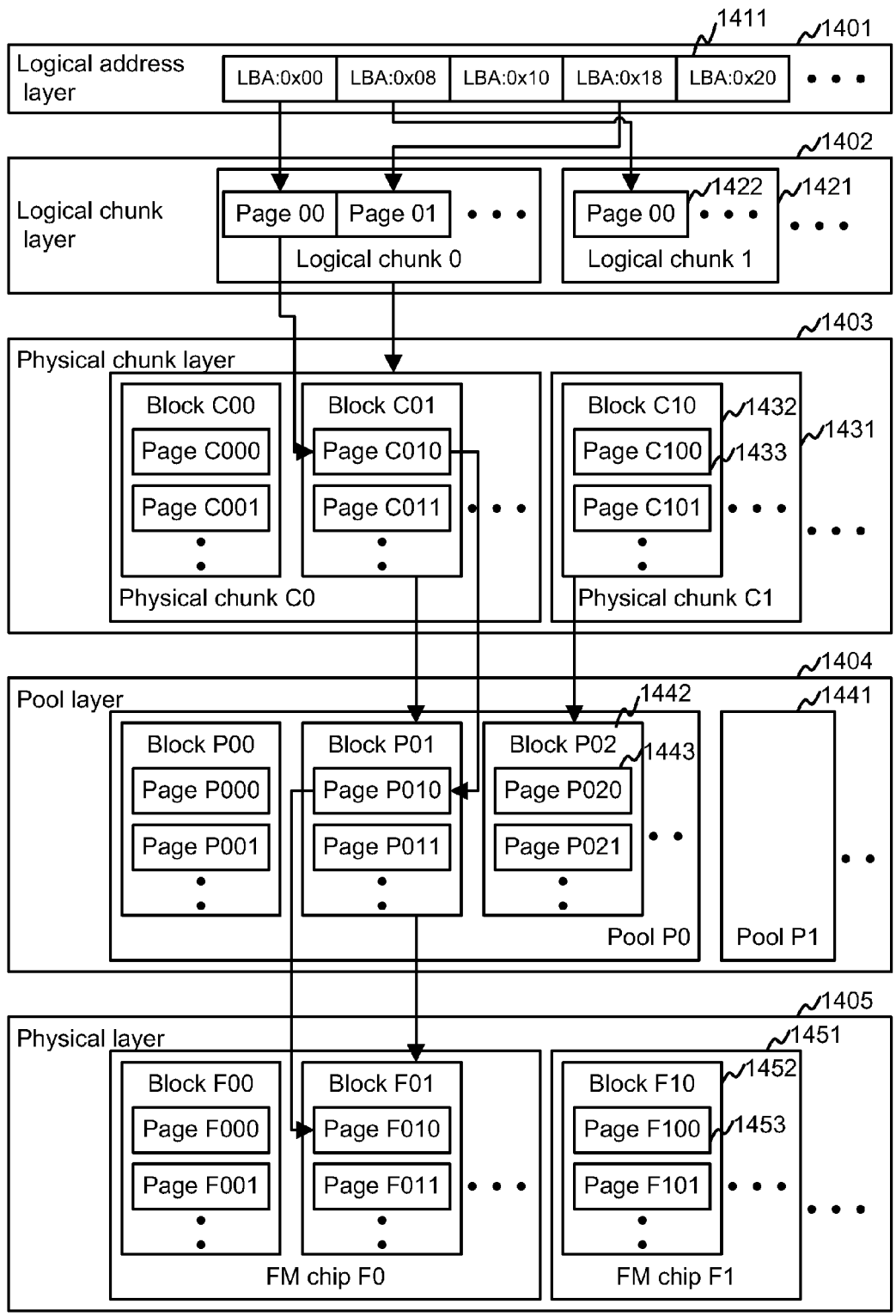
FIG. 14 shows a second example of a hierarchical structure for realizing a logical-physical translation related to the example.

FIG. 14 shows a second example of a hierarchical structure for realizing a logical-physical translation related to this example.

According to the second example shown in this drawing, the number of intermediate layers that exist between the logical address layer 1401 and the physical layer 1405 are more numerous than the first example shown in FIG. 25.

That is, the highest layer is the logical address layer 1401, and the above-described logical chunk layer 1402 is under the logical address layer 1401, but according to the second example, there is also a physical chunk layer 1403 under the logical chunk layer 1402, and there is a pool layer 1404 under the physical chunk layer 1403. The physical layer 1405 is under the pool layer 1404. Either one of the physical chunk layer 1403 or the pool layer 1404 may be done away with.

The physical chunk layer 1403 comprises multiple physical chunks 1431. Each physical chunk 1431 comprises multiple blocks 1431. Each block 1431 comprises multiple pages 1433. Hereinafter, a block in the physical chunk 1431 may be called "PC block", and a page in the physical chunk 1431 may be called "PC page".

The pool layer 1404 comprises multiple pools 1441. Each pool 1441 comprises multiple blocks 1442. Each block 1442 comprises multiple pages 1443. Each pool 1441 may be the same size. Hereinafter, a block in the pool 1441 may be called "pool block", and a page in the pool 1441 may be called "pool page". Multiple FM chips 1451 may comprise multiple FM chip groups, and the pool may be based on one or more of the FM chip groups. An FM chip group may be a circuit board, for example, a DIMM (Dual Inline Memory Module) comprising multiple FM chips that make up the FM chip group. In a single FM chip group, two or more FM chips 1451 may share a chip enable line. Also, multiple FM chips 1451 may share a chip enable line that spans two or more FM chip groups. In accordance with this, starting one chip enable line makes it possible to write data parallelly to multiple FM buses 223 sharing this chip enable line. Therefore, as will be explained further below, it is desirable that mapping be performed such that the physical pages of multiple FM chips having different FM buses 223 are allocated to adjacent logical pages 1411.

The PC page 1433 and the pool page 1443 are substantially the same as the physical page 1453. Also, the PC block 1432 and the pool block 1442 are substantially the same as the physical block 1452.

A logical chunk 1421, for example, is mapped on a one-to-one basis to a physical chunk 1431. A PC block 1432, for example, is mapped on a one-to-one basis to a pool block 1442. A pool block 1442, for example, is mapped on a one-to-one basis to a physical block 1452.

The LBA 0x00 is mapped to the LC page #00. This LC page #00 is mapped to the PC page #C010 in the physical chunk #00 to which the logical chunk #0 is mapped. The PC page #C010 is mapped to the pool page #P010 in the pool block #P01 to which the PC block #C01 is mapped. The pool page #P010 is mapped to the physical page #F010 in the physical block #F01 to which the pool block #P01 is mapped.

In the mapping with respect to these respective layers, the assigning of either restrictions or degrees of freedom can produce appropriate performance, life, and logical-physical translation information size. For example, in this example, striping is performed when translating from the logical address layer 1401 to the logical chunk layer 14012, and adjacent logical address ranges (logical pages 1411) are mapped to different logical chunks (for example, adjacent logical chunks) 1421 rather than to the same logical chunk 1421. That is, by making the configuration such that different logical chunks (for example, adjacent logical chunks) 1421 are mapped to physically different resources (for example, FM chips 1451, and even more specifically, to FM chips 1451 having different FM buses 223), adjacent logical address ranges (logical pages 1411) can be allocated to different physical resources, making parallel processing possible. As will be explained further below, this allocation is performed in this example.

In this example, in the logical chunk layer 1402 and the physical chunk layer 1403, the logical chunk 1421 and the physical chunk 1431 correspond on a one-to-one basis. For example, the logical chunk #0 is fixedly allocated to the physical chunk #C0. However, the allocations of the pages 1422/1433 in the logical/physical chunks 1421/1431 can be freely changed. For example, in FIG. 14, the LC page #00 of logical chunk #0 is mapped to the PC page #C010 of PC block #C01 of physical chunk #C0, but in a case where a write is performed to a location (LBA 0x00) in the logical space of this area and new data is written, this data is written to another PC page in the physical chunk #C0, and no particular restriction is placed on this location. For this reason, the write-target data can be arranged at an unrestricted location in the physical chunk 1431. Here, when using a physical location restriction described further below, it is possible to arrange pages having similar trends (for example, data for which the access frequency is similar) in the same PC block 1432 (physical 1452). This, for example, enables a data group that is expected to be written with high frequency such as a so-called hotspot to be collected in the same PC block 1432 (physical 1452), or, alternatively, a data group that is expected to be written very infrequently to be collected in the same PC block 1432 (physical block 1452), and, in anticipation of a sequential write in the future, contiguous data at a logical address to be collected in the same PC block 1432 (physical block 1452). In accordance with this, for example, in a case where an erase process is to be performed with respect to a PC block 1432 (physical block 1452) in which data that is written very frequently has been collected, it is highly likely that the data that exists in this PC block 1432 (physical block 1452) has already been invalidated by another write, and the amount of copy processing (the amount of data copied in a reclamation) can be expected to decrease. Raising the degree of freedom with respect to a physical location makes it possible to collect pages with more similar trends, and makes it possible to reduce the copy amount, but, alternatively, the disadvantage is that the size of the logical-physical translation information 312 becomes larger. In this example, all the LC pages 1422 in the logical chunk 1421 can be mapped to the PC pages 1433 in the physical chunk 1431, making it necessary to include a mapping table denoting the corresponding relationship between the LC pages 1422 and the PC pages 1433 in the logical-physical translation information 312.

In this example, in the translation of the physical chunk payer 1403 and the pool layer 1404, it is assumed that multiple physical chunks 1403 use the resources of a single pool 1441. Also, the unit of the resources provided from the pool 1441 to the physical chunk 1403 is the block 1442, and the block 1432 in the physical chunk 1403 is mapped on a one-to-one basis to a block 1442 in the pool 1441. However, this corresponding relationship changes dynamically. In FIG. 14, the block #C01 of physical chunk #C0 is allocated to the block #P01 of pool #P0, and the block #C10 of physical chunk #C1 is mapped to the block #P02 of pool #P0. Also, mapping is not performed in units of pages, but rather is determined in accordance with the relative location in the block. That is, the page #C010, which is the first page of the block #C01, is automatically allocated to the first page #P010 in the block #P01. Similarly, the page #0011 is allocated to page #P011, and these allocations are automatically decided when the allocation relationship between the blocks (C01 and P01) has been determined. The allocation between blocks will be described further below.

In this example, the relationship between the pool layer 1404 and the physical layer 1405 is determined in accordance with the mapping between the blocks 1442 and 1452. It is supposed that the mapping (corresponding relationship) between the blocks 1442 and 1452 is fixed in this example. For example, the block #P01 in the pool #P0 is allocated to the block #F01 in the FM chip #F0, Similarly, it is supposed that the mapping between the pages 1443 and 1453, i.e., a page 1433 in a block 1432 of a physical chunk 1403 and a page 1443 in a block 1442 of a pool 1441, is uniquely determined in accordance with their relative locations in the blocks 1442 and 1452. In accordance with appropriately determining the mapping of physical resources here, it becomes possible to readily perform the parallel processing mentioned above. For example, adjacent logical address ranges (logical pages) are mapped to different adjacent logical chunks 1421, and the adjacent logical chunks 1421 are mapped to adjacent physical chunks 1432. As mentioned above, since these mappings are fixed, the configuration may be as described hereinabove. When the physical chunks 1431 are different, it is desirable that the FM buses 223 be different. With a block 1432 used in a physical chunk 1431 being dynamically changed, the block 1402 cannot be fixedly mapped. However, in this example, a pool 1441 to be used is mapped to each physical chunk 1431. That is, it is supposed that adjacent pools 1441 are mapped to adjacent physical chunks 1431, and, in addition, that different FM chips (preferably, FM chips having different buses 223) 1451 are mapped to adjacent pools 1441. In accordance with this, adjacent logical address ranges (logical pages) 1411 are mapped to different FM chips (preferably, FM chips having different FM buses 223) 1451. This makes it possible to parallelly access (that is, to perform parallel processing) multiple FM chips 1451 when accessing large size data or during sequential accessing. Also, parallel processing is realized by all of the above fixed mappings, doing away with the need to be conscious of the FM chip 1451, which is the physical location in dynamic physical block mapping. For this reason, a physical location restriction can be realized in accordance with a pre-existing configuration, eliminating the need for arithmetic processing for restricting a physical location during an IO process. In FIG. 14, the page 1411 to which LBA 0x00 belongs and the page 1411 to which LBA #0x08 belongs are respectively allocated to the logical chunks #0 and #1. The logical chunks #0 and #1 are respectively allocated to the physical chunks #C0 and #C#1. The physical chunks #C0 and #C#1 are respectively allocated to the pools #P0 and #P1. The pools #P0 and #P1 are respectively allocated to FM chips #F0 and #F1. Consequently, in a case where adjacent logical pages 1411 (the page 1411 to which LBA 0x00 belongs and the page 1411 to which LBA 0x08 belongs) are accessed either simultaneously or sequentially, both of the FM chips #F0 and #F1 operate.

Next, the allocation of a pool block 1442 to a physical chunk 1403 will be described. In FIG. 14, the pool block #P02 is allocated to the physical chunk #C1, but as explained hereinabove, the corresponding relationship between these changes dynamically. Furthermore, not only does the location of a pool block 1442 allocated to a certain physical chunk 1431 change, but the number of pool blocks 1442 allocated to the physical chunk 1431 can also change. In this example, it is supposed that the number of LC pages 1422 included in a certain logical chunk 1421 is fixed, and that the number of PC blocks 1432 included in a physical chunk 1431 can increase and decrease. In accordance with this system, it is supposed that increases and decreases in the amount of physical resources allocated to a certain logical space, that is, in the number of physical pages actually capable of being used with respect to a certain number of logical pages, can be realized, and that performance and life can be adjusted. This system will be explained in detail further below using FIGS. 15 and 16.

Also, in this example, it is supposed that the number of pages 1422 in a logical chunk 1421 is fixed, and that the above-mentioned adjustment is realized by changing the number of blocks 1432 in a physical chunk 1431, but another method may be used. For example, the number of LC pages 1422 included in a logical chunk 1421 may be increased or decreased. Also, in this example, the corresponding relationship between a logical chunk 1421 and a physical chunk 1431 is one-to-one, but may also be one-to-many or many-to-one.

Furthermore, in this example, the size of all the pages from the logical address layer 1401 to the pool layer 1404 is the same size as the physical pages 1453 of the physical layer 1405, but the size of a page in at least one of the layers from the logical address layer 1401 to the pool layer 1404 (may be called "higher-level page" hereinafter) may be a size different from the size of the physical page 1453. For example, any of the following may be used.
(1) Making the size of the higher-level page smaller than the size of the physical page 1453 realizes improved performance and life for accesses that are smaller in size.
(2) Making the size of the higher-level page larger than the size of the physical page 1453 reduces the size of the logical-physical translation information 312.
(3) Parallel processing is realized by allocating one logical page 1411 in the logical address layer 1401 to multiple physical pages 1453 of different FM chips 1451 (preferably, FM chips 1451 having different FM buses 223).

Also, the resources considered in the physical layer 1405 are not limited to the FM chip 1451 itself. In a case where a single FM chip 1451 comprises multiple circuit boards, the circuit boards may also be considered as resources. Also, a part coupled via a chip enable, which is a type of control line of the FM chip 1451, and/or a FM bus 223 to which multiple FM chips 1451 are coupled may also be considered as resources when conscious of parallel processing in the physical layer 1405.

Furthermore, this example describes a configuration, which is conscious of adjacent components in each hierarchy and allocates these components to multiple physical resources, but these components do not have to be adjacent.

Figure 15:
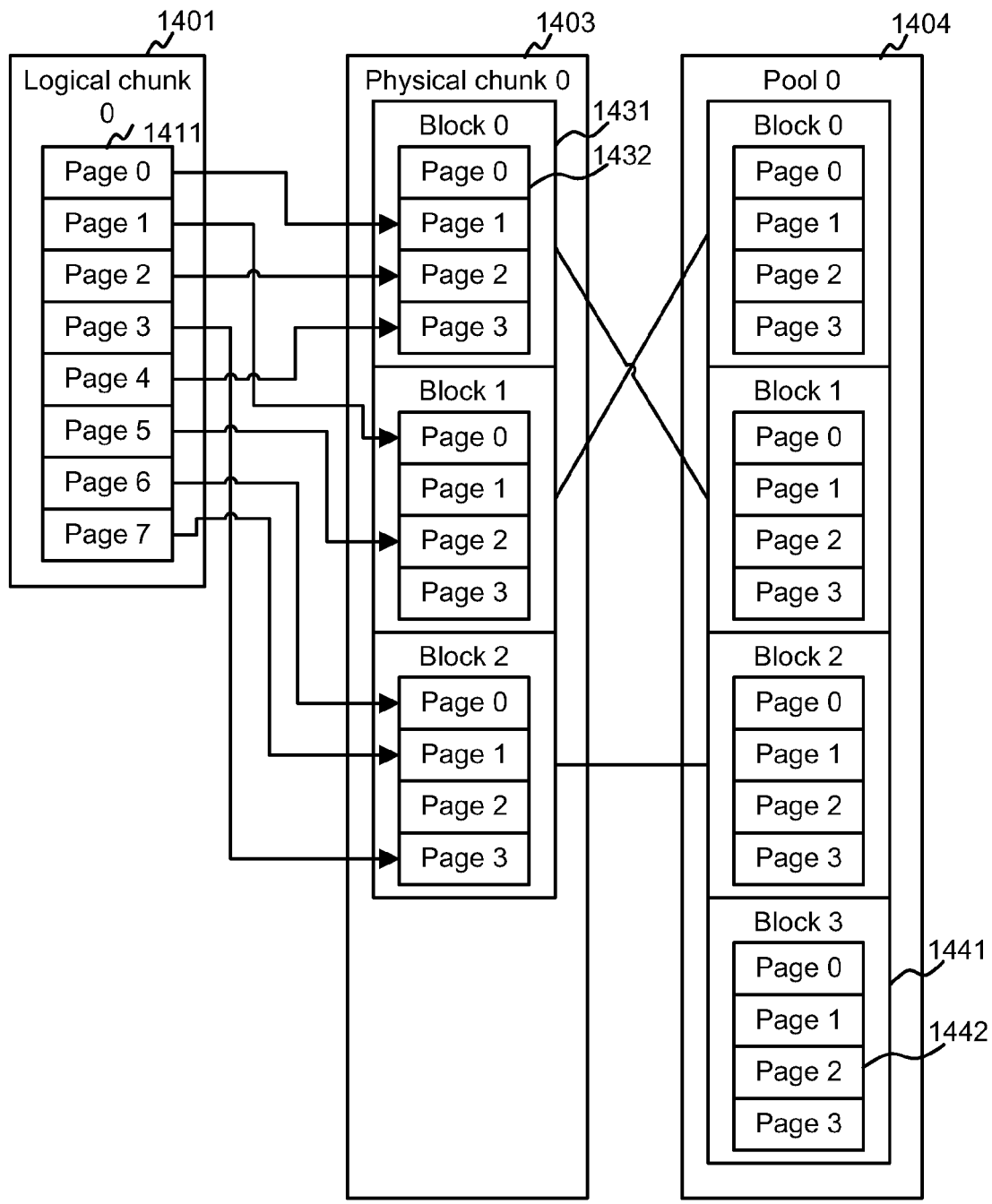
FIG. 15 shows a first example of area corresponding relationships (corresponding relationships between a logical chunk, a physical chunk, and a pool) related to the example.

FIG. 15 shows an example of corresponding relationships between a logical chunk 1421, a physical chunk 1431 and a pool 1441.

All the LC pages 1422 that belong to a logical chunk 1421 are allocated to PC pages 1433 in a physical chunk 1431. Basically, any PC page 1433 is allocated to a LC page 1422 corresponding to a logical page 1411 that constitutes a write destination. Also, the blocks #0, #1, and #2 belonging to the physical chunk #0 are the blocks #0, #1, and #2 belonging to the pool #0, and are in a state in which these blocks are being used by the physical chunk #0. Block #3 of the pool #0 is not allocated to the physical chunk #0. Also, in the example of FIG. 15, there are eight LC pages 1422 included in the logical chunk #0, and there are 12 PC pages 1433 included in the physical chunk #0 allocated to these LC pages 1422.

Figure 16:
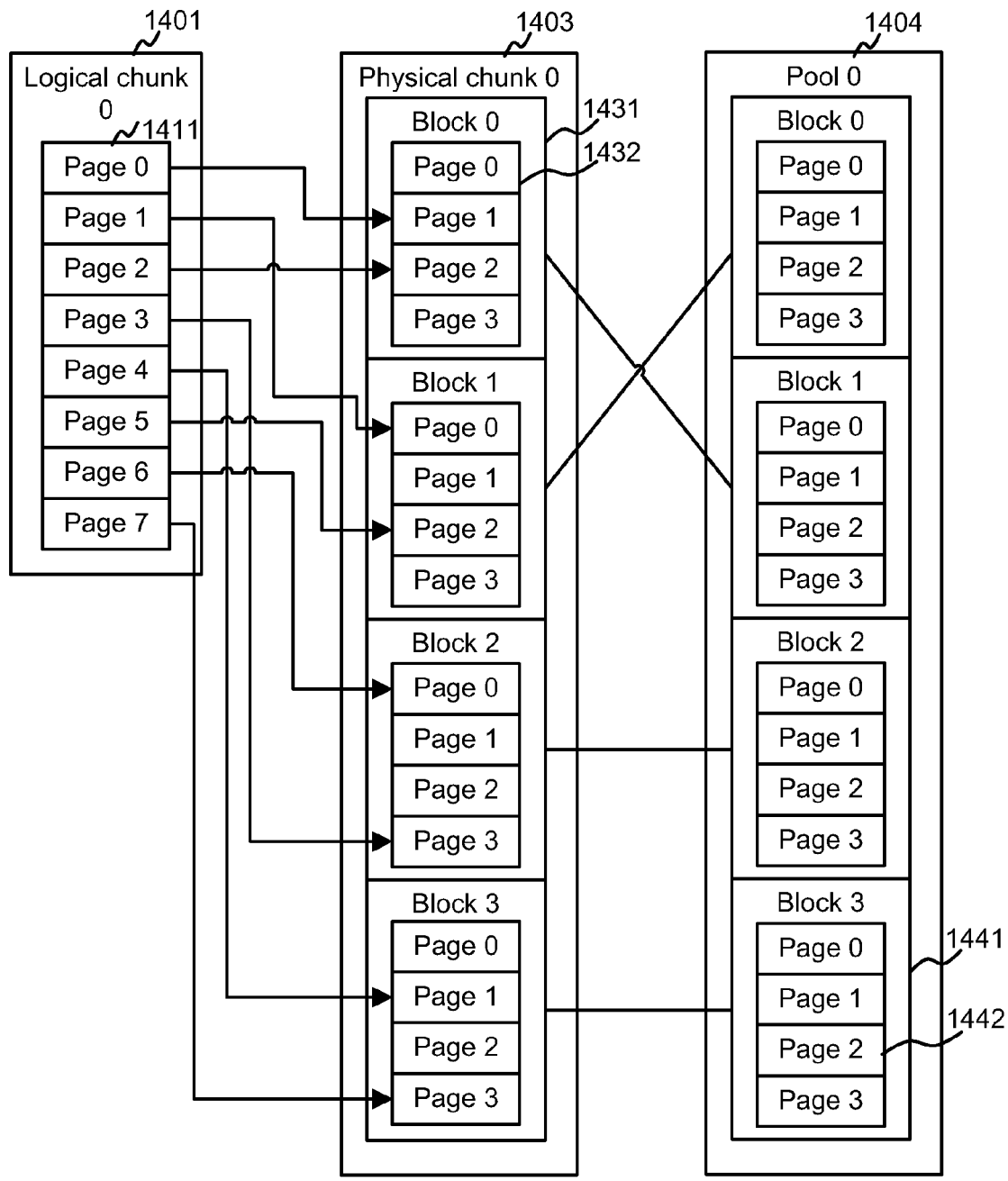
FIG. 16 shows a second example of area corresponding relationships (corresponding relationships between a logical chunk, a physical chunk, and a pool) related to the example.

FIG. 16 shows a state in which pool block #3 has been allocated to the physical chunk #0 from the state of FIG. 15.

This corresponds to a state in which a new pool block #3 from the pool #0 has been reserved as a resource for the use of the physical chunk #0 (that is, the logical chunk #0) from FIG. 15. At this time, the number of pages 1422 belonging to the logical chunk #0 remains unchanged at eight, and the pages 1433 included in the physical chunk #0 have increased to 16. For this reason, this corresponds to a state in which numerous update data storage areas have been reserved for the user capacity. That is, the relationship between FIG. 15 and FIG. 16 is the same as the relationship between FIG. 10 and FIG. 13, which boosted performance and life more than that of FIG. 6 and FIG. 9.

Figure 26:
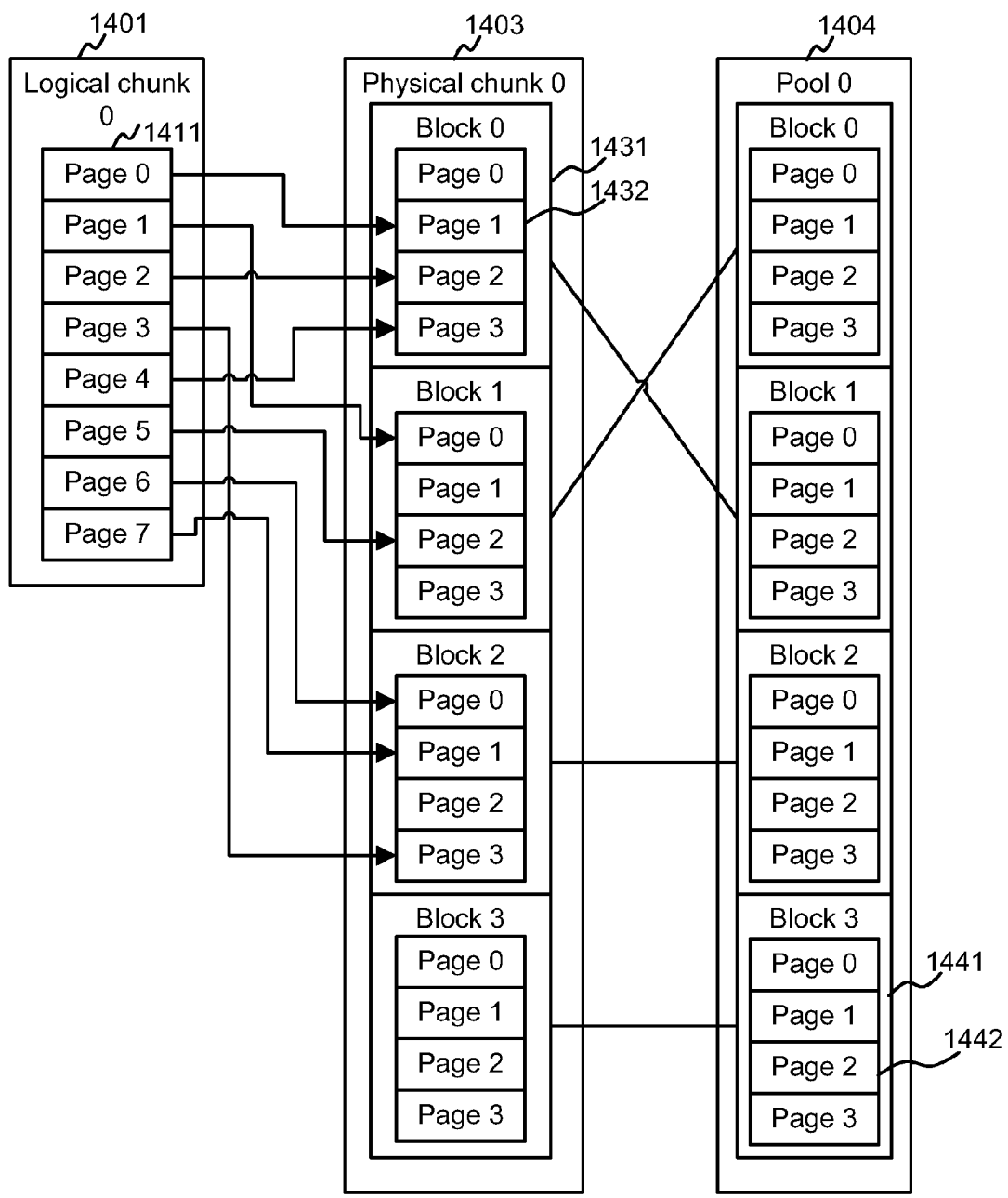
FIG. 26 shows a third example of area corresponding relationships (corresponding relationships between a logical chunk, a physical chunk, and a pool) related to the example.

FIG. 26 is a situation in which the logical page mapping has been organized from the state of FIG. 16.

According to the valid data save process in S512 of FIG. 5, a state in which a logical page 1411 (LC page 1422) is not allocated to the block #3 of physical chunk #0 has been created.

Based on the state of FIG. 26, a state in which the block #3 of physical chunk #0 has been released is equivalent to that of FIG. 15. At this time, there are eight pages 1422 included in the logical chunk #0 and 12 pages 1433 included in the physical chunk #0. In FIG. 26, the state is such that the allocation status of block #3 of pool #0, which had been allocated to block #3 of physical chunk #0, is released and does not belong to any physical chunk 1431. Consequently, as was done from FIG. 15 to FIG. 16, the block #3 of pool #0 may be allocated anew to the physical chunk #0 or to a physical chunk 1431 that uses another pool #0.

Thus, improvements in performance and the like can be easily realized by adjusting the number of blocks 1432 that belong to a physical chunk 1431, and these blocks can be adjusted in units of logical chunks.

Figure 28:
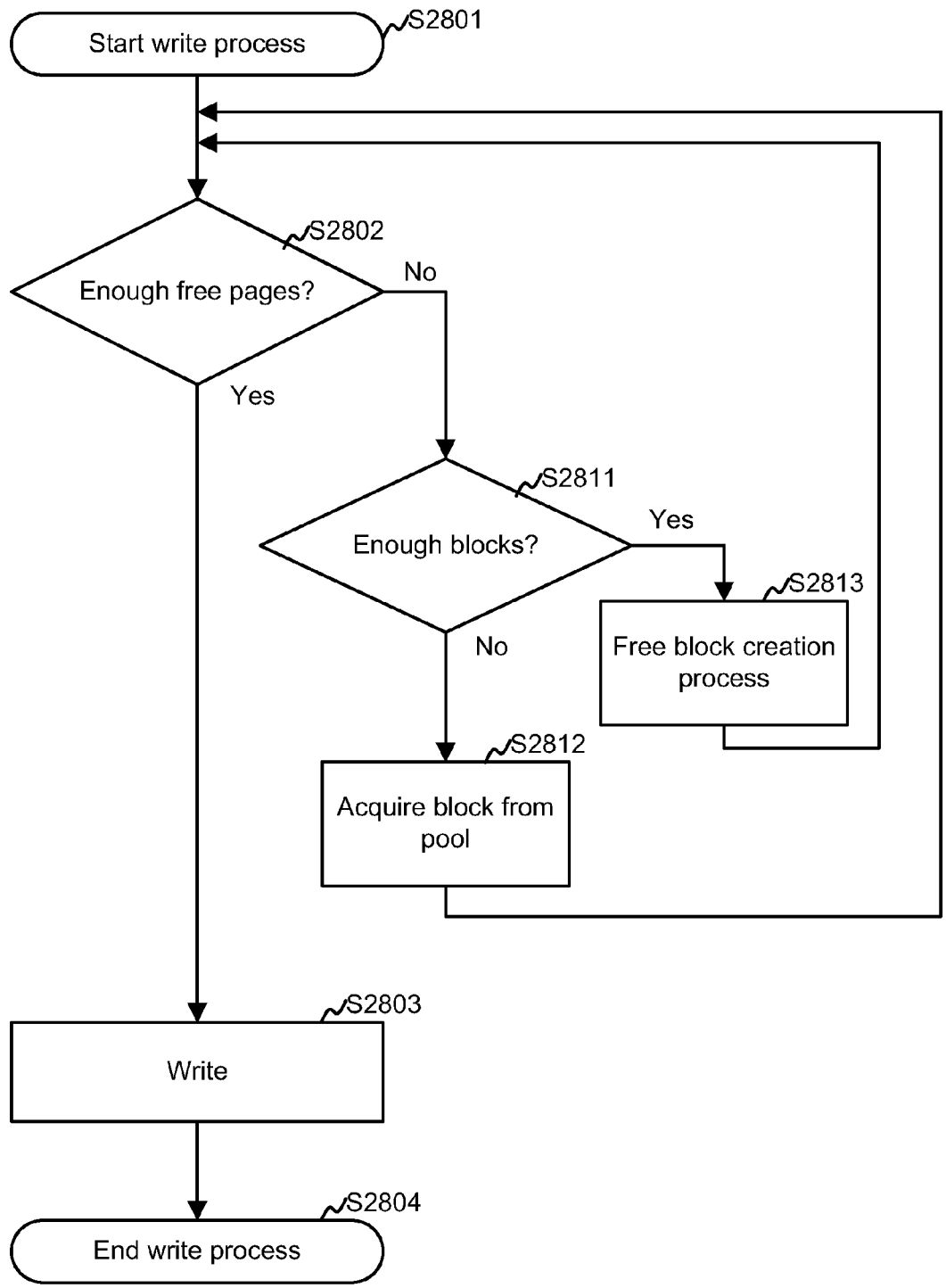
FIG. 28 is a flowchart showing a second example of the flow of a write process related to the example.

FIG. 28 shows an example of the flow of processing for adding a process for acquiring a block 1442 from the pool 1441 to a write process (FIG. 5). The points of difference with FIG. 5 will be the main focus of the following explanation.

In a case where there are not enough free physical pages for write use, the flash controller determines whether or not there are enough blocks in the write-destination physical chunk (S2802). The write-destination physical chunk is the physical chunk mapped to the logical chunk comprising the page that corresponds to the logical address range (page 1411) to which the write-destination logical address belongs. The determination made in S2802 will be described in detail further below, but based on the fact that performance and life change in accordance with the number of blocks allocated to a physical chunk as has been described up to this point, there is an anticipated value for the number of blocks for meeting the performance and life requirements, and the determination of S2802 determines whether or not the number of blocks in the physical chunk is equal to or larger than this anticipated value. The anticipated value for the number of blocks in the physical chunk, for example, is clear based on the "target" of the "capacity allocation status" of a table T2301 shown in FIG. 23.

In a case where there are not enough blocks, the flash controller acquires a block from the pool (S2812). Any pool may be the acquisition source of the block, and may be selected on the basis of a given policy (for example, either capacity priority or performance priority). For example, the flash controller, in a case where performance priority (for example, operating multiple FM chips in parallel when an access is generated to a contiguous logical address range) is the policy, may select a pool such that access is carried out to a different pool (FM chip) than in a case where an access has been generated to adjacent logical address ranges.

In a case where there are enough blocks, the flash controller performs a free block creation process (S2813) for the write-destination physical chunk due to the need to create a free block from the blocks that have already been allocated to the write-destination physical chunk. After performing block acquisition (S2812) and the free block creation process (S2813), the flash controller once again returns to the determination of the number of free physical pages for write use (S2802), and continues the write process. Furthermore, in FIG. 28, the series of processes (S2811, S2812, S2813) for creating a free physical page are implemented synchronously with the write process, but these processes may be implemented asynchronously to the write process the same as in the free physical page creation process of FIG. 5.

Figure 29:
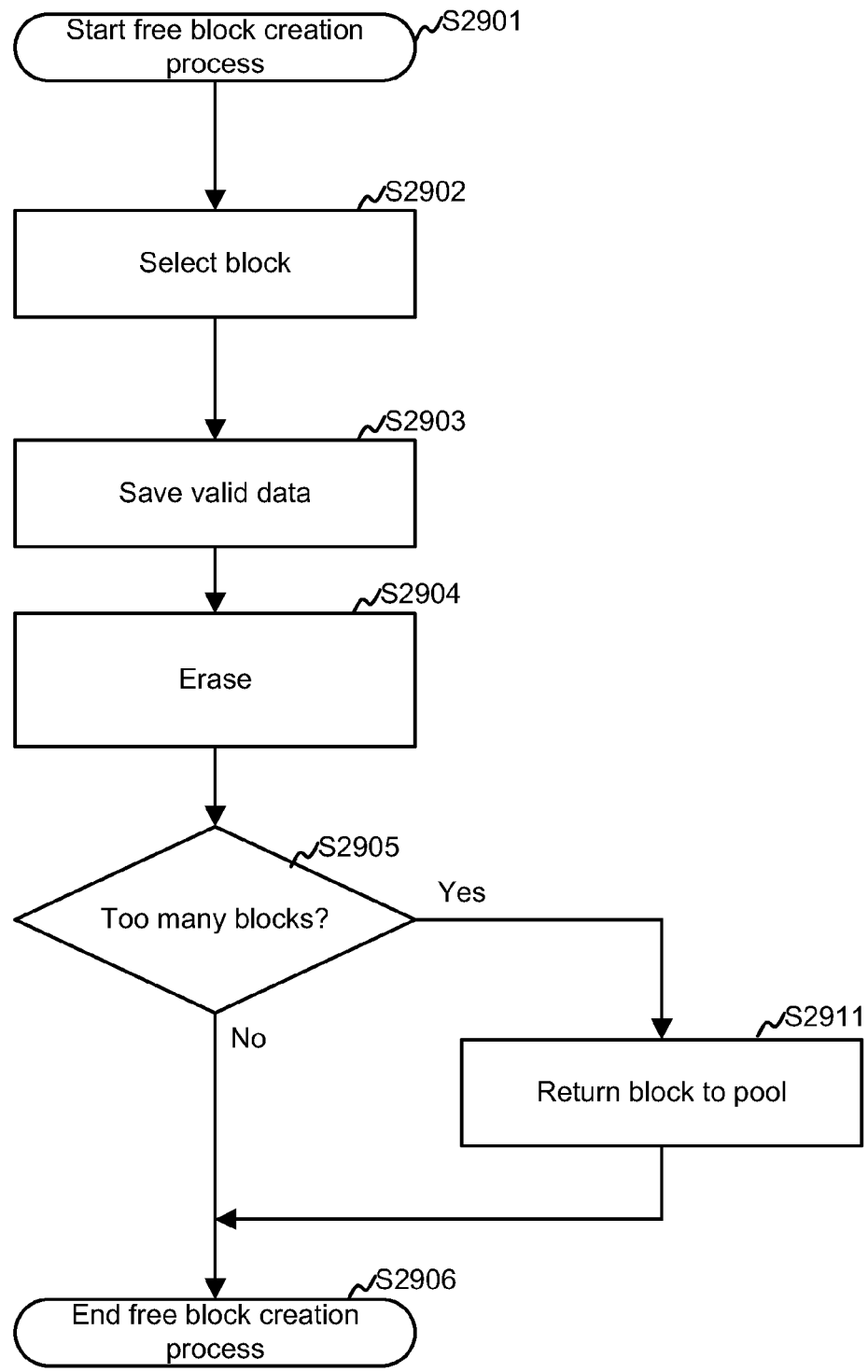
FIG. 29 shows an example of the flow of a free block creation process related to the example.

FIG. 29 shows an example of the flow of the free block creation process (S2813).

When the free block creation process starts (S2901), the flash controller first selects a free physical page creation target block (S2902). Next, the flash controller saves the valid data in the selected block to another block (S2903), and thereafter, since this block comprises only non-valid physical pages, implements an erase process with respect to this block (S2904). The processing up to S2904 is the same as the free block creation process (S511, S512, S513) in FIG. 5, and a free block is created in accordance therewith.

Next, the flash controller determines whether or not the number of blocks in the physical chunk undergoing processing is equal to or larger than an anticipated value (S2905).

In a case where the number of blocks is less than the anticipated value, the flash controller ends the free block creation processing as-is (S2906).

In a case where the number of blocks is equal to or larger than the anticipated value, the flash controller returns a created free block to the pool (S2911). The return-destination pool may be a pool based on the FM chip 1451 comprising the free block. S2911 corresponds to the release process for the block allocated to a physical chunk, and is a process for allocating an appropriate amount of blocks to each physical chunk. Furthermore, in FIG. 28, the free block creation process is executed synchronously with the write process, but the free block creation process may be executed asynchronously to the write process the same as the process for creating a free physical page.

Figure 17:
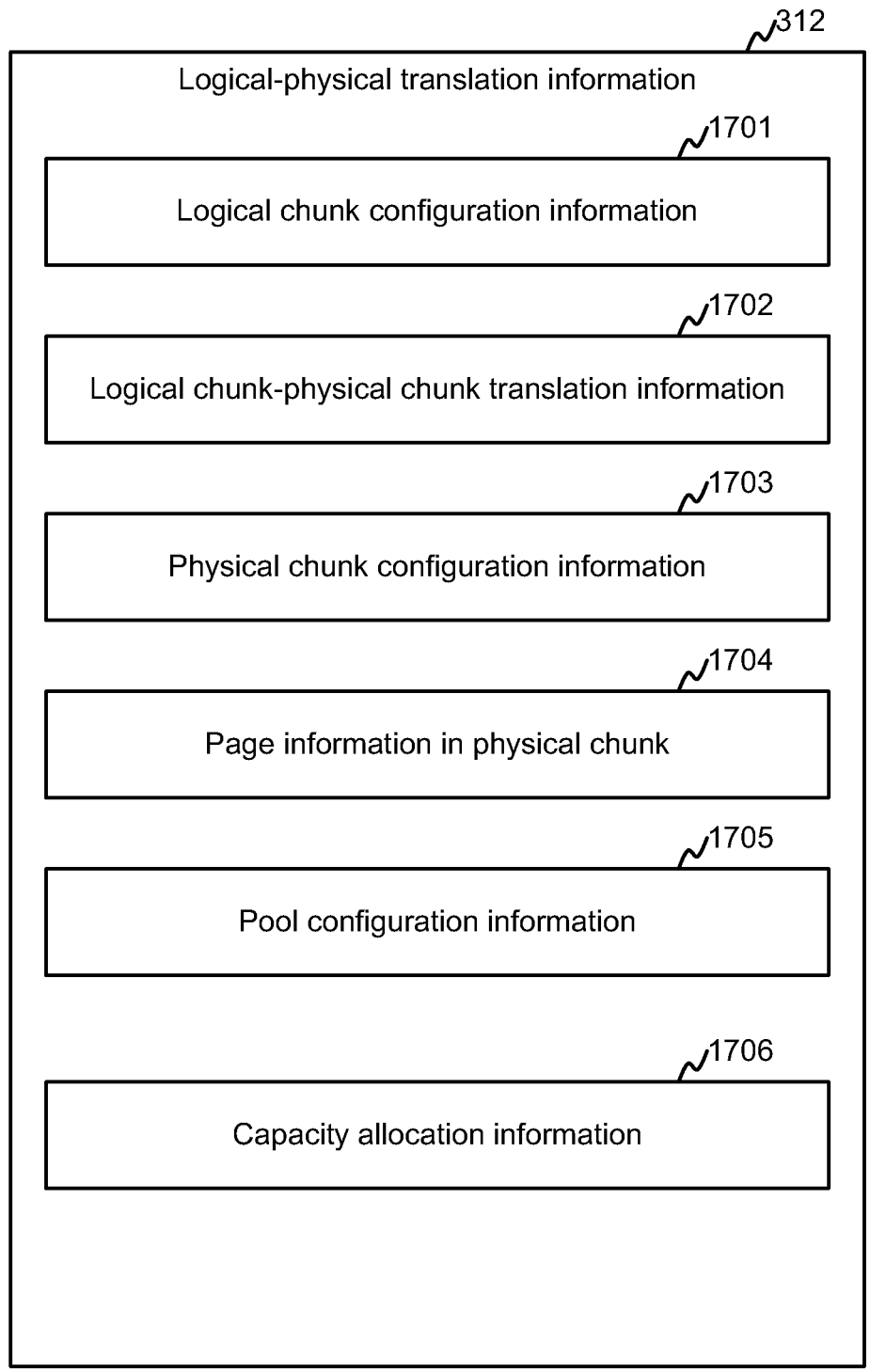
FIG. 17 shows an example of an information group comprising logical-physical translation information related to the example.

FIG. 17 shows an example of an information group included in the logical-physical translation information 312.

The logical-physical translation information 312 comprises logical chunk configuration information 1701, logical chunk-physical chunk translation information 1702, physical chunk configuration information 1703, page information in physical chunk 1704, pool configuration information 1705, and capacity allocation information 1706. This information will be explained below.

FIG. 18 shows an example of the configuration of logical chunk configuration information 1701.

This information 1701 comprises a logical chunk configuration information table T1801. The table T1801 shows the LC page and logical chunk in the logical chunk layer 1402 to which each logical page 1411 of the logical address layer 1401 is allocated.

According to FIG. 18, since this information is expressed in accordance with a table, the numbers of the logical chunk and LC page to which a page in the logical space is allocated may be freely decided.

Alternatively, a method, which applies a simple allocation between the logical address layer and the logical chunk layer is also effective. For example, a method by which an LC page number in a logical chunk increases in ascending order of the LBAs (logical addresses), and when the page number reaches a number conforming to the upper limit for the number of pages in the logical chunk, an LBA is allocated to the next logical chunk, is conceivable. In addition, a method such that a logical chunk number is added in LBA ascending order without changing the page number in the logical chunk as in the table T1801 of FIG. 18, is also conceivable. In the case of methods that provide these simple rules, the logical chunk configuration information 1701 need not be realized as a table, and determining the configuration in accordance with a computational formula is also possible. This makes it possible to scale down the amount of memory, and to reduce the search process when determining the relevant logical chunk number and page number.

FIG. 19 shows an example of the configuration of logical chunk-physical chunk translation information 1702.

This information 1702 comprises a logical chunk-physical chunk translation information table T1901. The table T1901 shows the physical chunk 1431 and the PC page 1433 in the physical chunk layer 1403 to which each page 1422 in the logical chunk 1421 is allocated. In this example, mapping between the logical chunk layer 1402 and the physical chunk layer 1403 is implemented in page units.

FIG. 20 shows an example of the configuration of physical chunk configuration information 1703.

This information 1703 comprises a logical chunk configuration information table T2001. The table T2001 shows the where the pool being used by a physical chunk 1431 is, how many blocks the physical chunk 1431 currently possesses, and what the numbers of these block are. To reduce the size of the logical-physical translation information 312, the blocks being used with respect to a physical chunk 1431 are arranged in consecutive order here. In accordance with this, a relevant physical page number and the location of a page in this physical block are identified based on the number of the page in the physical chunk 1431 in the table T1901. That is, a location is identified in page units.

FIG. 21 shows an example of the configuration of page information in a physical chunk 1704.

This information 1704 comprises a page information in physical chunk table T2101. The table T2101 shows the status of each block and the pages therein that belong to each physical chunk (which LC page a physical page is currently allocated to, whether unallocated invalid data is being stored, or whether it is a free physical page).

This table T2101 need not be only information required in an IO process. For example, a block number may be identified from a used block number in this table T2101, and arranging the page numbers in consecutive order may do away with the need for registering these page numbers in the table T2101. Of the statuses, the page number in the logical chunk may be done away with since there is a reverse-direction method for checking a physical location based on a logical location. However, this is useful information in a case where it is necessary to check a logical location based on a physical location. One such case, for example, might be a case in which a failure occurs in a FM chip 1451 or a portion thereof, making it necessary to identify the logical location based on the failed physical location (the FM chip, block, or page) and save the data.

FIG. 22 shows an example of the configuration of pool configuration information 1705.

This information 1705 comprises a pool configuration information table T2201. The table 2201 shows the status of FM chip and physical block that constitute the basis of each pool (for example, the physical chunk to which a pool currently belongs, and either an independent or free state). Information as to the FM bus 223 and other such resources to be managed by the physical layer 1405 may also be listed in the table T2201.

FIG. 23 shows an example of the configuration of capacity allocation information 1706.

This information 1706 comprises a capacity allocation table T2301. This table T2301 shows the attribute and status of each storage area, as well as how it should change. Here, in accordance with the table T2301, a storage area is shown using a logical address. The attributes of the respective storage areas, for example, include an attributes that is decided based on the utilization method of the higher-level apparatus, such as a RAID 5 parity, an attribute that is decided from operation-based statistical information such as high-frequency writes, and an attribute that is decided based on an instruction from the administrator, such as a capacity specification.

Meanwhile, in a system, which adjusts performance and life in accordance with the number of blocks in the physical chunk, it is desirable that the information ultimately determined using this table T2301 be the capacity (number of blocks) to be allocated to each physical chunk. Consequently, in the capacity allocation table T2301, a translation from a storage area to a physical chunk is performed. According to FIG. 23, a configuration in which a certain contiguous storage area comprises multiple physical chunks, and a certain physical chunk does not span multiple storage areas is employed. It is desirable to employ this configuration is a case where the storage area is large in size, the logical chunk is small in size, and the size and number of stripes is small.

In a case other than that described hereinabove, one physical chunk spans multiple storage areas, making management using a format like that of FIG. 23 difficult. In accordance with this, it is desirable that information denoting how much data of which attributes be included for each physical chunk, and that the capacity to be allocated be decided based on this information.

In the capacity allocation table T2301, a current allocated capacity and a target capacity are managed for each physical chunk. Furthermore, in this example, since the size of the logical chunk is fixed, the allocated capacity targeted will be the same for physical chunks having the same attributes. Based on this table T2301, the blocks of a physical chunk are reserved and released. For example, since the current capacity of the physical chunk #0, which is associated with the storage area #1, is 4 MB and the target is 4 MB, block reservation/release processing is not performed. As for the physical chunk #10, which is associated with storage area #1, since the current capacity is 6 MB and the target is 8 MB, the number of allocated blocks is less than the target, and a block will be added to this physical chunk #10. This may be implemented at the time of a free physical page reservation process (S2812) synchronized to a write, or at the time of an asynchronous free physical page reservation process. Alternatively, since the current capacity of the physical chunk #40 of storage area #4 is 6 MB and the target is 3 MB, the number of allocated blocks is excessive, and a block may be released from this physical chunk #40 and this block may be returned to the pool. That is, a block return process (S2911) may be implemented during a free block creation process.

Thus, the allocation target size of a specific physical chunk may be decided based on the attribute of the storage area, and a resource may be allocated from the pool 1441 so as to conform to this target. However, for example, in a case where high-frequency writes occur in all the storage areas, and a capacity of equal to or larger than the physical capacity is required, there is the likelihood that satisfying all the targets will not be possible. For this reason, the current and target values may be monitored at all times, and allocation may be controlled in accordance with the capacity allocation status of the capacity allocation table T2301.

A storage area denoted in the capacity allocation table T2301 is shown as a logical address, and, as was described above, an item that is decided by an instruction from the administrator exists in the attributes of each storage area. However, it is impossible to identify a logical address on a flash storage device 141 from the host 102 and management system 103 that use the storage system 101.

Figure 30:
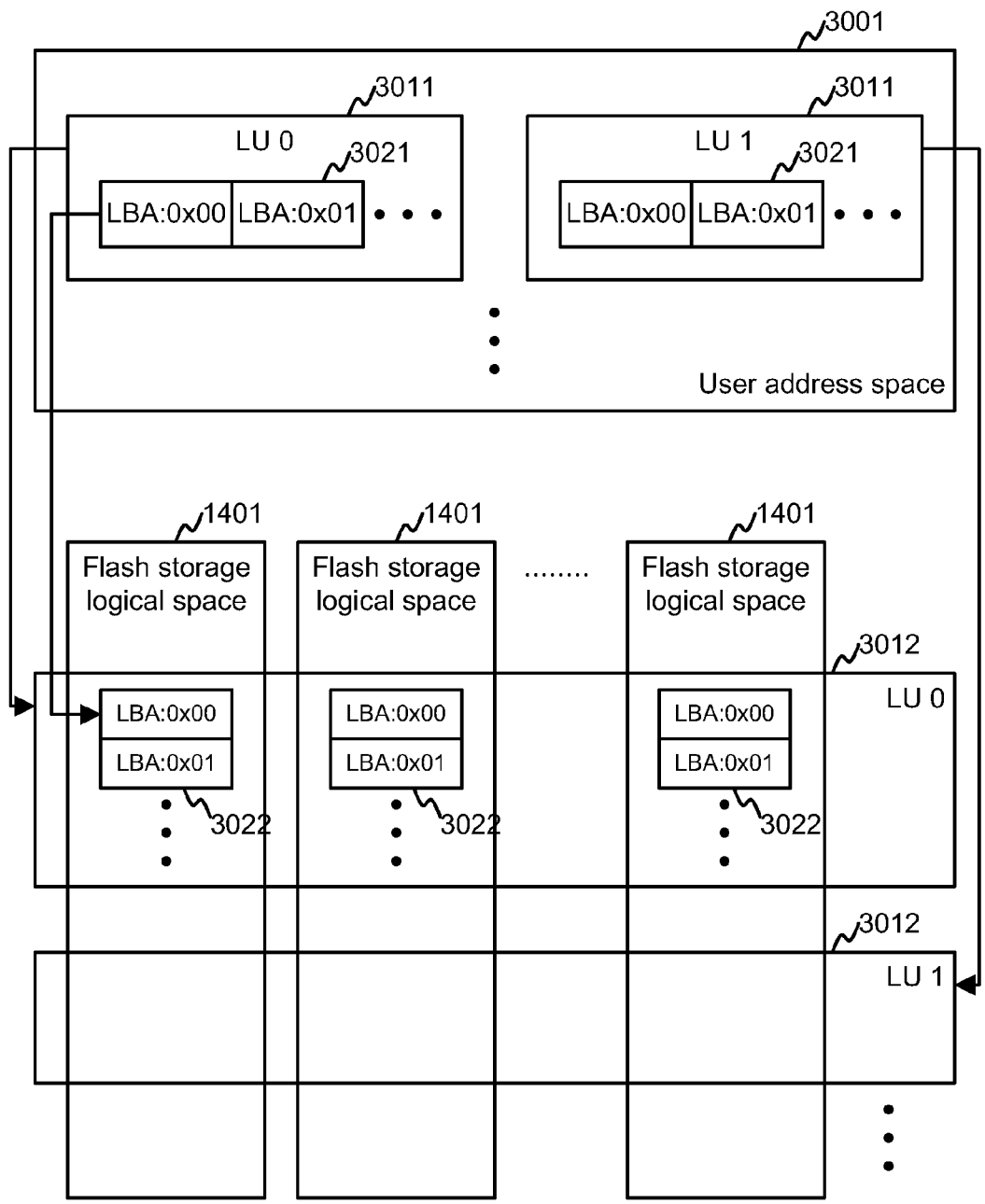
FIG. 30 shows an example of an address space corresponding relationship (the relationship between an address space used by a user and a logical address space on a flash storage device).

FIG. 30 shows an example of the relationship of the logical address space on the flash storage device 141 with the address space used by the user of the host 102 (and/or management system 103).

A user address space 3001, which is used by the user, is normally decided in accordance with a LU (Logical Unit) number and the logical address (LBA) thereof. In FIG. 30, there are multiple LUs 3001 and multiple logical blocks 3021 exist therein. The LU 3011 inside the user address space 3001 is allocated to a LU 3012 configured by spanning multiple flash storage logical spaces 3002. A logical block 3021 inside the user address space 3001 is similarly allocated to a volume block 3022 inside the flash storage logical space (logical address space) 1401.

The host issues a command, such as a read or a write, to an address in each LU, and the address of the issued command is ultimately allocated to a logical space on the flash storage device 141. This allocation is generally performed by the RAID controller 111. FIG. 30 shows an example of an allocation, but various patterns of this allocation method exist in accordance with a redundant data configuration method and data storage arrangement for imparting redundancy, which is called a RAID level, a unit of data distribution called striping and the distribution range thereof, and a data arrangement virtualization function called a virtual allocation function, and it is not easy for the user to be conscious of these patterns and to decide on an operation. That is, it is not easy for the user to be conscious of the logical address in the flash storage device 141, and it is also not possible for the user to set an attribute that specifies this logical address.

Alternatively, a unit that the user can be conscious of and can set an attribute and the like for is the LU. For example, LUs are generally used in different applications, such as using a specific LU in a database and using another LU in a file system, and the user is able to configure an attribute in accordance with these applications. Furthermore, a LU may be a pool LU comprising a segment that is allocated to an area of a virtual LU (TP-LU), which conforms to Thin Provisioning. The pool LU is a LU comprising a capacity pool, and is managed by being partitioned into multiple segments. A segment is allocated to an area of the TP-LU. In this case, the segment may comprise one or more logical blocks 3021.

Figure 24:
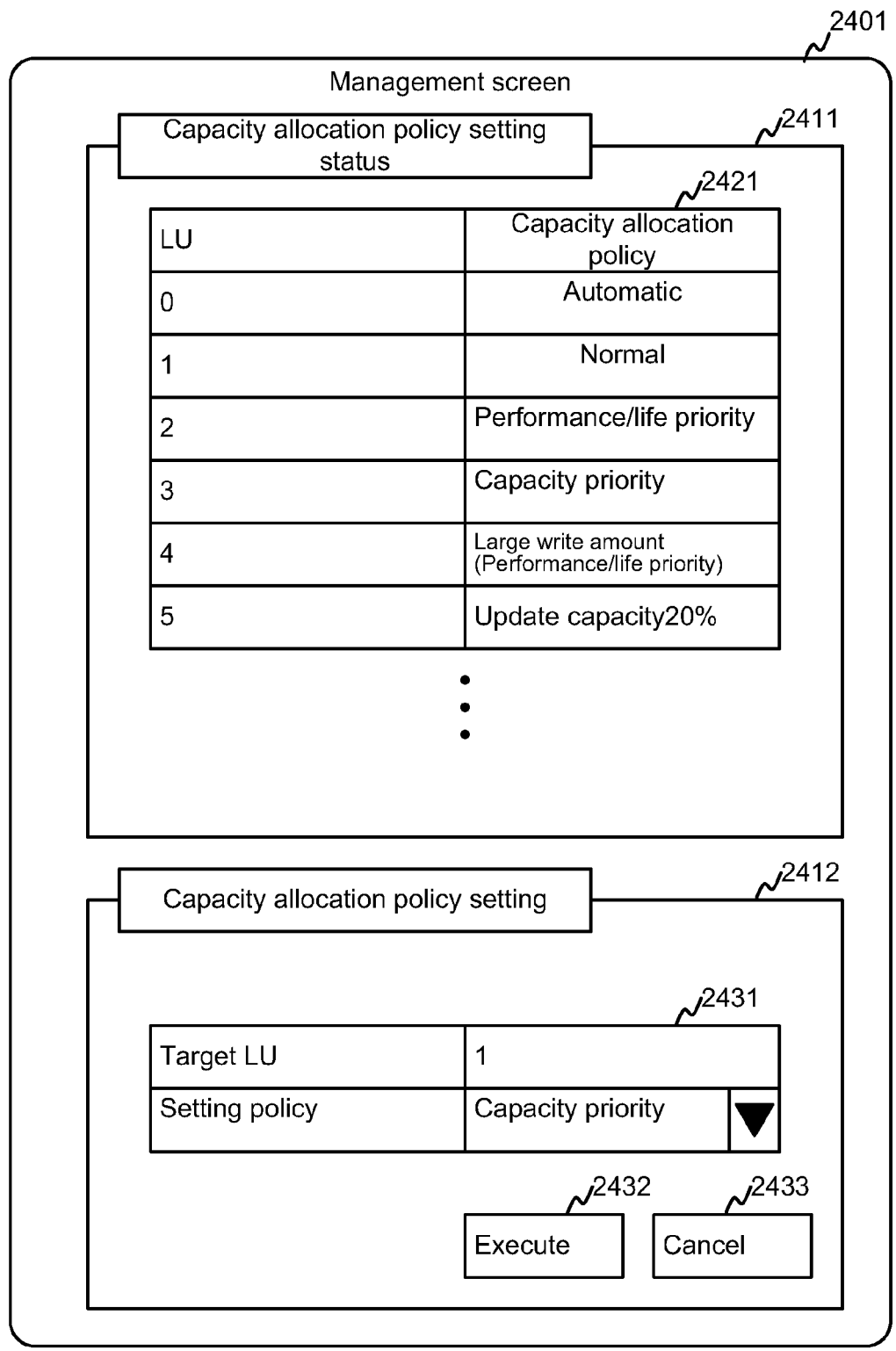
FIG. 24 shows a second example of a hierarchical structure for realizing a logical-physical translation related to the example.

FIG. 24 shows an example of a management screen for configuring a capacity allocation policy.

The "management screen" referred to here is a screen that is displayed on a management system display. The management screen 2401 displays a capacity allocation policy setting status 2411, and a capacity allocation policy setting part 2412. There is a policy setting status table 2421 in the capacity allocation policy setting status 2411 showing the current policy of each LU.

Examples of the items configured as policies in FIG. 24 will be described below.

"Automatic", which is configured for LU #0, signifies that the flash storage device 141 automatically performs the capacity setting.

"Normal", which is configured for LU #1, signifies that a capacity allocation of the amount normally used in the flash storage device 141 is performed. That is, a physical chunk capacity, which on average is capable of being allocated to a logical chunk in the flash storage device 141, is allocated to the logical chunk used by the LU #1.

"Performance/life priority", which is configured for LU #2, signifies that extra physical chunk capacity is allocated to the logical chunk used by LU #2 so as to boost performance and life.

"Capacity priority", which is configured for LU #3, signifies that a little less physical chunk capacity is allocated to the logical chunk used by LU #3.

"Large write amount", which is configured for LU #4, is not a format that specifies the allocation amount, but rather is specified by the user as the TO characteristics for the relevant LU. Since the write amount is large, the same setting as that for performance/life priority is performed to operate the relevant LU efficiently. That is, extra physical chunk capacity is allocated to the logical chunk used by the LU #4.

"Update capacity 20%", which is configured for LU #5, is a format that specifies a specific capacity percentage. In accordance with this, a physical chunk capacity of 120% of this capacity is allocated to the logical chunk used by the LU #5.

The capacity allocation policy setting part 2412 comprises a setting part 2431, an execute button 2432, and a cancel button 2433. In accordance with selecting a target LU and a policy to be configured in the setting part 2431 and pressing the execute button 2432, a combination of the LU and policy is reflected.

In FIG. 24, a policy is configured in LU units, but may be configured in another type of unit that is user specifiable. For example, in a case where the most detailed setting is made, this setting becomes the same as the storage area in the capacity allocation table T2301, and this constitutes a logical chunk unit in this example. However, as explained hereinabove, to avoid the user making a flash storage-conscious setting, the LU is desirable as the unit that enables the user to recognize the IO characteristics and target performance. In addition to the LU, a file system unit or a file unit may be useful as the setting unit in a case where a file server is used as the higher-level apparatus.

The settings of this management screen are for the storage system 101. A LU unit setting is converted to a flash storage logical space and registered in the capacity allocation information 1706 in the flash storage device 141.

Figure 27:
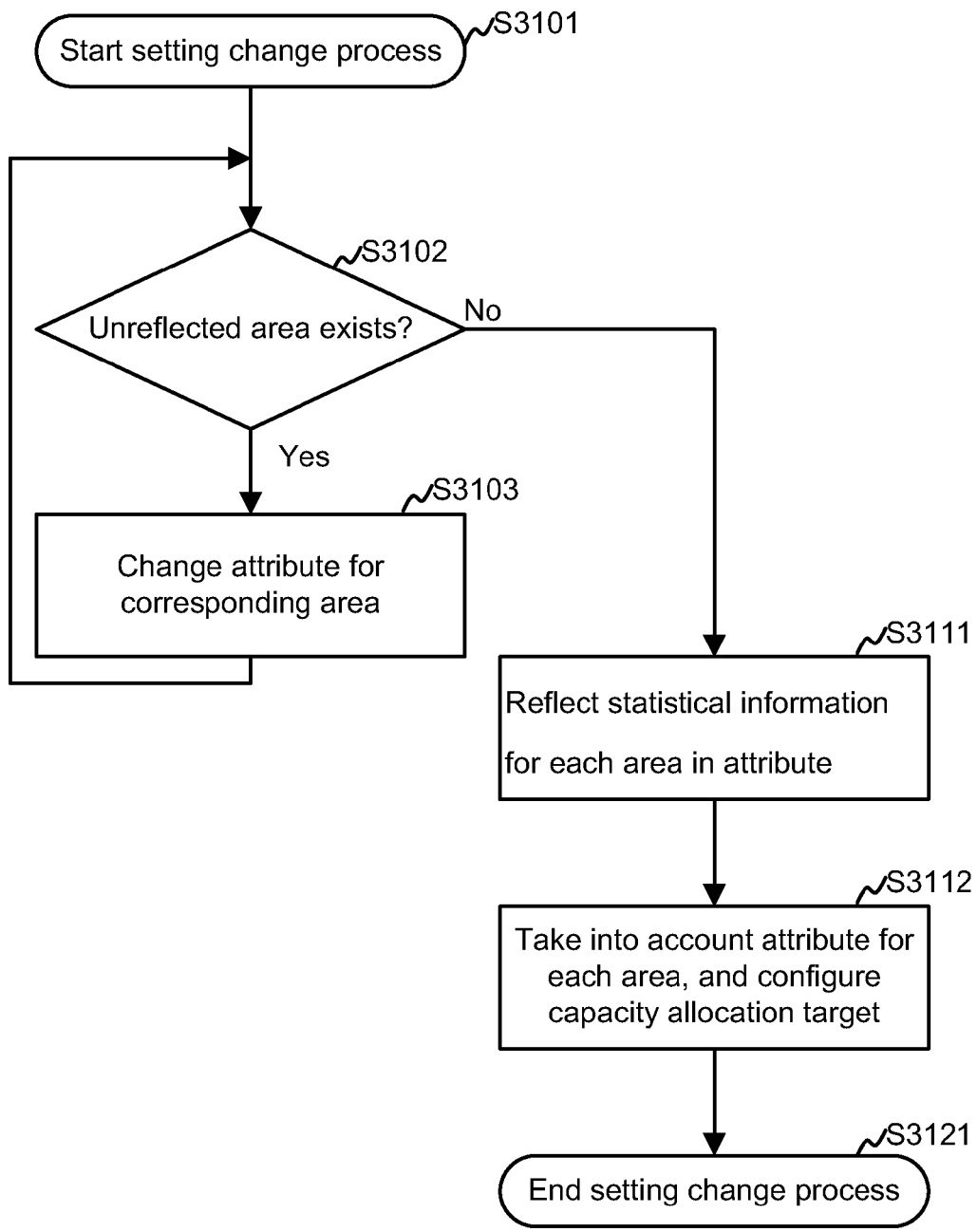
FIG. 27 shows an example of the flow of a capacity allocation information change process related to the example.

FIG. 27 shows an example of the flow of processing for changing the capacity allocation information 1706.

This flow of processing is started in accordance with the setting of the capacity allocation policy shown in FIG. 24, the changing of configuration information, and regular updating. As shown in FIG. 24, it is assumed that the capacity allocation policy is configured in LU units in this example. For this reason, it is supposed that a policy, which is set and changed in FIG. 24, is changed to a logical address unit setting of the flash storage device 141 and that this setting reaches the flash storage device 141. For example, in a case where LU 1 is configured to capacity priority in the capacity allocation policy setting 2412 of FIG. 24, the RAID controller 111 specifies the flash storage device 141 and logical address thereof corresponding to the LU 1, and issues a same setting change instruction. This flow of processing is also executed in accordance with changing the configuration information. This configuration information change, for example, corresponds to a case in which a certain LU in the storage system 101 is deleted, a case in which a LU is added, or a case in which the RAID configuration is changed and locations of the data and parity have changed. For example, in a case where a certain LU is deleted, the flash storage device 141 logical address allocated to this LU can be released, and since the physical allocation capacity changes in accordance with this operation, a change process becomes necessary. Additionally, this flow of processing is executed on a regular basis because statistical information such as a write frequency is included in the capacity allocation information 1706 and this information is updated regularly.

The change process is started in accordance with a trigger such as that mentioned above (S3101), and the flash controller first checks whether there is an area in which the setting change has not been reflected (S3102). The area is an area in the capacity allocation information 1706.

In a case where an unreflected area exists, the flash controller changes the attribute with respect to the relevant area (S3103). The attribute is changed here in accordance with a user instruction. For example, in FIG. 24, in a case where the LU 1, which was specified as normal, is changed to capacity priority, the specification is changed from normal to capacity priority with respect to the area in which the LU 1 is stored.

In S3102, in a case where an unreflected area does not exist, the flash controller reflects the statistical information for each area in the attribute (S3111). This is the write frequency and other such attribute information for each area, and is an item that is decided independent of a user instruction.

Since the attributes of all the areas are stipulated in accordance with S3103 and S3111, the flash controller takes these attributes into account in deciding the target allocation capacity (S3112). At this time, it is desirable that areas other than capacity specified areas be numeric values that take into account the overall average of the allocation targets. This is because, for example, there is the likelihood of processing becoming inefficient, such that all areas are configured as performance priority in a case where the capacity of the entire physical chunk is two times the capacity of the entire logical chunk, and, in a case where the target physical chunk capacity of each area is configured at three times the logical chunk capacity, the current allocation capacity for all the areas falling below the target in accordance with the status, and a state in which attempts are constantly made to reserve blocks in the physical chunk occurring, resulting in a rash of block reservations and releases.

Since all the capacity allocation information 1706 is updated to the latest information when the capacity allocation target is configured, the flash storage ends the processing (S3121). Thereafter, the flash storage performs block reservation processing (S2812) and so forth in accordance with the new capacity allocation information 1706.

As described hereinabove, the attributes of the storage area are configured in storage area units (for example, LU units). The storage area attributes, for example, include an attribute (for example, a RAID level) denoting the method by which the storage area is used by the higher-level apparatus, an attribute (for example, an access frequency or a last access time) denoting statistical information acquired with respect to the storage area during operation, and an attribute (for example, the allocation of y % (for example, y being a value that is larger than 0 but equal to or smaller than 100) of a target value (anticipated value)) conforming to an instruction from the administrator with respect to the storage area. In accordance with such storage area attributes, the flash controller (or either the RAID controller or the management system) decides the target value (anticipated value) of the capacity of the physical chunk belonging to this storage area. For example, the computation method for this target value may be one that that multiplies a coefficient conforming to the storage area attribute by a prescribed standard value. The storage area attribute may be decided in accordance with a policy inputted with respect to the storage area unit.

An example has been explained hereinabove, but the present invention is not limited to this example. For example, the information (logical-physical translation information 312) of the flash storage 131 may be held by the RAID controller 111. At least a portion of the processing performed by the flash controller may be carried out by the RAID controller 111.

REFERENCE SIGNS LIST

101 Storage system

The invention claimed is:

1. A storage system, comprising:
   a nonvolatile semiconductor storage medium;
   a storage part for storing logical-physical translation information, which is information denoting the corresponding relationship between a logical address and a physical storage area of the nonvolatile semiconductor storage medium; and
   a media controller, which is a controller coupled to the storage part and the nonvolatile semiconductor storage medium, wherein
   the logical-physical translation information includes:
   (A) information denoting corresponding relationships between multiple logical pages and multiple logical chunks forming a logical address space of the nonvolatile semiconductor storage medium; and
   (B) information denoting corresponding relationships between the multiple logical chunks and multiple physical storage areas,
   each logical page is a logical storage area conforming to a logical address range,
   each logical chunk is allocated to two or more logical pages of the multiple logical pages,
   two or more physical storage areas of the multiple physical storage areas are allocated to each logical chunk,
   the media controller is configured so as to identify, based on the logical-physical translation information, a physical storage area allocated to a logical chunk to which a logical page to which a data write-destination logical address belongs is allocated, and to write the data to this identified physical storage area, and
   the media controller adjusts the number of physical storage areas to be allocated with respect to each logical chunk, wherein
   pages of different logical chunks are allocated to adjacent logical pages, and
   physical storage areas of different physical resources are allocated to pages of different logical chunks.

2. A storage system according to claim 1, wherein
   the information of the (B) comprises the following (b1) information:
   (b1) information denoting corresponding relationships between multiple logical chunks and multiple physical chunks, and wherein
   two or more physical storage areas of the multiple physical storage areas are allocated to the physical chunk.

3. A storage system according to claim 2, wherein
   the information of the (B) comprises the following (b2) information:
   (b2) information denoting corresponding relationships between the multiple physical chunks and multiple pools, and wherein
   two or more physical storage areas of the multiple physical storage areas are allocated to the pools, and
   (X) the media controller allocates one of the physical storage areas to the physical chunk from one of the pools the to which this physical chunk is allocated; and
   (Y) the media controller returns the physical storage area, which is allocated to this physical chunk, to the pool.

4. A storage system according to claim 3, wherein
   pages of different logical chunks are allocated to adjacent logical pages,
   areas of different physical chunks are allocated to pages of different logical chunks, and
   different areas of a pool, to which physical storage areas of different physical resources are allocated, are allocated to different physical chunks.

5. A storage system according to claim 4, wherein
   the nonvolatile storage medium is a flash memory of a type in which data is erased in units of blocks and access is performed in units of pages, and
   the flash memory comprises multiple memory chips coupled to different multiple flash memory buses,
   each memory chip comprises multiple physical blocks,
   each of the physical blocks comprises multiple physical pages,
   the physical storage area is the physical page,
   the physical chunk area is any block of multiple of the blocks forming the physical chunk,
   the pool area is any block of the multiple blocks forming the pool,
   multiple blocks of the multiple pools are allocated to multiple blocks of the multiple physical chunks,
   multiple physical blocks in the multiple memory chips are allocated to multiple blocks of the multiple pools, and
   the different physical resources are different flash memory buses.

6. A storage system according to claim 5, wherein the media controller, in a case where free physical pages equal to or larger in size than write-target data do not exist in a physical block corresponding to a write-destination logical page group, is configured to determine, for each logical chunk to which each logical page of the write-destination is allocated, whether or not the number of blocks allocated to a physical chunk corresponding to this logical chunk is equal to or larger than an anticipated value of this physical chunk, and in a case where the result of this determination is negative, as the (X), is configured to add a block to this physical chunk from the pool to which this physical chunk is allocated.

7. A storage system according to claim 6, wherein target values of blocks allocated to this physical chunk may differ in accordance with this physical chunk attribute.

8. A storage system according to claim 7, wherein the physical chunk attribute is decided in accordance with a policy specified in units of the storage area to which this physical chunk belongs.

9. A storage system according to claim 8, comprising:
multiple nonvolatile storage devices; and
a higher-level controller coupled to the multiple nonvolatile storage devices and a host apparatus, wherein
each nonvolatile storage device comprises the nonvolatile storage medium, the storage part, and the media controller,
a logical unit, which is a logical storage area based on the multiple nonvolatile storage devices, is provided to the host apparatus, and
logical addresses of the logical unit correspond to the respective logical addresses of the multiple nonvolatile storage devices based on this logical unit.

10. A storage system according to claim 1, wherein
the different physical resources are different buses through which data written to a physical storage area from the media controller is routed, and
the media controller, in a case where contiguous multiple logical pages are the write destination, is configured to parallelly write the data to multiple different physical storage areas via multiple different buses.

11. A storage system according to claim 1, wherein
multiple physical storage areas are arranged on two or more different circuit boards, and
the different physical resources are the different circuit boards.

12. A storage system according to claim 1, wherein
the nonvolatile storage medium is a flash memory of the type in which data is erased in units of blocks and access is performed in units of pages,
the flash memory comprises multiple memory chips coupled to different multiple flash memory buses, wherein
each memory chip comprises multiple physical blocks,
each physical block comprises multiple physical pages,
the physical storage area is the physical page, and
the information of the (B) comprises the following (b1) information:
(b1) information denoting corresponding relationships between multiple logical chunks and multiple physical chunks.

13. A storage system according to claim 12, wherein
the information of the (B) comprises the following (b2) information:
(b2) information denoting corresponding relationships between multiple physical chunks and multiple pools,
multiple blocks of the multiple physical chunks are allocated to multiple blocks forming the pool, and
the media controller, in a case where free physical pages equal to or larger in size than write-target data do not exist in a physical block corresponding to a write-destination logical page group, is configured to determine, for each logical chunk to which each logical page of the write-destination is allocated, whether or not the number of blocks allocated to a physical chunk corresponding to this logical chunk is equal to or larger than an anticipated value of this physical chunk, and in a case where the result of this determination is negative, is configured to add a block to this physical chunk from the pool to which the physical chunk is allocated.

14. A storage system storage control method for performing storage control on the basis of logical-physical translation information, which is information denoting a corresponding relationship between a logical address and a physical storage area of a nonvolatile semiconductor storage medium,
the logical-physical translation information including:
(A) information denoting corresponding relationships between multiple logical pages and multiple logical chunks forming a logical address space of the nonvolatile semiconductor storage medium; and
(B) information denoting corresponding relationships between the multiple logical chunks and multiple physical storage areas,
the storage control method comprising a step of adjusting the number of physical storage areas to be allocated to each logical chunk, wherein
pages of different logical chunks are allocated to adjacent logical pages, and
physical storage areas of different physical resources are allocated to pages of different logical chunks.

* * * * *